US 7,671,479 B2

(12) United States Patent
Kim et al.

(10) Patent No.: US 7,671,479 B2
(45) Date of Patent: Mar. 2, 2010

(54) PORTABLE POWER PACK, FUEL/AIR SUPPLY FOR THE PORTABLE POWER PACK, UNIFLOW SCAVENGING MICRO-ENGINE FOR THE PORTABLE POWER PACK AND OPERATION METHOD THEREOF

(75) Inventors: Gang-Chul Kim, Daejeon (KR); Yong-Jae Lee, Daejeon (KR); Yong-Dug Pyo, Daejeon (KR); Young-Min Woo, Daejeon (KR); Oh-Seuk Kwon, Daejeon (KR); Jong-Pyo Cho, Seoul (KR); Hak-Geun Jung, Daejeon (KR); Nam-Jo Jeong, Daejeon (KR); Jong-Huy Kim, Daejeon (KR); Choong-Sik Bae, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 26 days.

(21) Appl. No.: 11/932,477

(22) Filed: Oct. 31, 2007

(65) Prior Publication Data
US 2008/0224476 A1    Sep. 18, 2008

(30) Foreign Application Priority Data

| Mar. 15, 2007 | (KR) | ...................... 10-2007-0025392 |
| Mar. 15, 2007 | (KR) | ...................... 10-2007-0025393 |
| Mar. 15, 2007 | (KR) | ...................... 10-2007-0025394 |
| Jul. 19, 2007 | (KR) | ...................... 10-2007-0072086 |

(51) Int. Cl.
*F02B 75/00* (2006.01)

(52) U.S. Cl. ..................................................... 290/1 A
(58) Field of Classification Search .................. 290/1 A
See application file for complete search history.

(56) References Cited

U.S. PATENT DOCUMENTS

| 4,312,305 | A | * | 1/1982 | Noguchi et al. | ......... 123/51 BA |
| 4,480,611 | A | * | 11/1984 | Wendt | ...................... 123/197.5 |
| 4,823,746 | A | * | 4/1989 | Kaplan | ................... 123/145 A |
| 5,243,940 | A | | 9/1993 | Göpel | |
| 5,485,818 | A | * | 1/1996 | McCandless | ................ 123/294 |
| 5,626,294 | A | * | 5/1997 | McCandless | ............. 239/533.3 |
| 5,874,798 | A | * | 2/1999 | Wiegele et al. | ............. 310/168 |
| 5,932,940 | A | * | 8/1999 | Epstein et al. | ........ 310/40 MM |
| 6,276,313 | B1 | * | 8/2001 | Yang et al. | ................ 123/46 E |
| 6,397,793 | B2 | * | 6/2002 | Yang et al. | ................ 123/46 E |
| 6,446,426 | B1 | * | 9/2002 | Sweeney et al. | ........... 60/39.81 |

(Continued)

FOREIGN PATENT DOCUMENTS

JP    2001115899 A   *   4/2001

(Continued)

*Primary Examiner*—Joseph Waks
(74) *Attorney, Agent, or Firm*—Rothwell, Figg, Ernst & Manbeck, P.C.

(57) ABSTRACT

A small portable power pack includes a fuel/air supply for mixing fuel, which is supplied from outside, with outside air, thereby providing mixed gas; a uniflow scavenging micro-engine for receiving mixed gas from the fuel/air supply and igniting mixed gas to explode; a control panel for operating and controlling the uniflow scavenging micro-engine; a capacitor battery for powering the control panel and the uniflow scavenging micro-engine. The portable power pack is easily carried and used without the restriction of spaces and sites.

14 Claims, 27 Drawing Sheets

U.S. PATENT DOCUMENTS

| | | | |
|---|---|---|---|
| 6,460,493 B2 * | 10/2002 | Yang et al. | 123/46 R |
| 6,742,479 B2 * | 6/2004 | Yanagisawa | 123/1 A |
| 7,146,814 B2 * | 12/2006 | Gilton | 60/651 |
| 7,465,505 B2 * | 12/2008 | Shioya | 429/19 |
| 2009/0007953 A1 * | 1/2009 | Hsu | 136/205 |
| 2009/0169960 A1 * | 7/2009 | Nakamura | 429/34 |

FOREIGN PATENT DOCUMENTS

| | | | |
|---|---|---|---|
| JP | 2008223756 A | * | 9/2008 |
| KR | 10-2005-0119865 A | | 12/2005 |

* cited by examiner

PORTABLE POWER PACK, FUEL/AIR SUPPLY FOR THE PORTABLE POWER PACK, UNIFLOW SCAVENGING MICRO-ENGINE FOR THE PORTABLE POWER PACK AND OPERATION METHOD THEREOF

CROSS REFERENCE TO RELATED APPLICATIONS

This application claims priority from Korean patent application No. 10-2007-0025392 filed on Mar. 15, 2007, Korean patent application No. 10-2007-0025393 filed on Mar. 15, 2007, Korean patent application No. 10-2007-0025394 filed on Mar. 15, 2007 and Korean patent application No. 10-2007-0072086 filed on Jul. 19, 2007, all of which are incorporated herein by reference in their entireties for all purposes.

BACKGROUND OF THE INVENTION

1. Field of the Invention

The present invention relates to a portable power pack, and more particularly, to a small portable power pack, which can be easily carried and used without the restriction of spaces and sites, and includes a fuel/air supply, which is connected to a fuel tank containing dimethyl ether (DME) fuel, and an engine, which performs a series of procedures, such as ignition, explosion, compression and exhaustion to convert mechanical energy to electric energy using the fuel delivered from the fuel/air supply thereby powering various devices, such as portable electronic devices and autonomous robots.

2. Description of the Related Art

As well known to those skilled in the art, electronic devices have been miniaturized due to the manufacturing technologies of Micro Electro-Mechanical Systems (MEMS), each of which has held the spotlight as one of the advanced technologies in 21st century. This technology has enabled the rapid development of portable electronic devices, such as a mobile phone, a Personal Data Assistant (PDA) and a notebook computer, and created new fields, such as a Micro-Air Vehicle (MAV) and a micro-robot, thereby providing driving force for realizing the ubiquitous age. However, a capacitor battery or a power pack (i.e., a portable power supply) having high power output is essentially required because a portable mobile communication device needs a greater amount of electric energy due to the increase of the display size thereof and the addition of picture and dynamic image functions and a micro-robot should be able to move in a wide range and operate in a long period of time.

At present, a lithium (Li) ion capacitor battery, which is mainly used in small electronic devices, has an energy density of about 90 W-h/kg. This battery can consecutively operate for 3 to 4 hours, and has to be recharged after that. Accordingly, in order to prepare for more developed ubiquitous age, there is essentially required a power pack having an energy density of 500 W-h/kg or more, which enables such electronic devices to operate in a longer period of time.

However, the existing power pack is too complicated to reduce its size. Even if the power pack is miniaturized, the capacity thereof is insufficient to block the multiple use.

SUMMARY OF THE INVENTION

The present invention has been made to solve the foregoing problems with the prior art, and the present invention provides a compact portable power pack, which can be easily carried and used without the restriction of spaces and sites, and includes a fuel/air supply, which is connected to a fuel tank containing dimethyl ether (DME) fuel, and an engine, which performs a series of procedures, such as ignition, explosion, compression and exhaustion to convert mechanical energy into electric energy using the fuel delivered from the fuel/air supply, thereby powering various devices, such as portable electronic devices and autonomous robots.

The invention also provides a fuel/air supply, which can operate a plurality of impellers using the evaporation pressure of fuel and the pressure of exhaust gas in order to mix fuel and air and feed mixed gas into an engine, without additional devices such as a compressor and a pump, thereby reducing material costs, facilitating the manufacturing thereof due to a simple design, and reducing a manufacturing time.

The invention also provides a uniflow scavenging micro-engine for a portable power pack, in which mixed gas including fuel fed from a fuel tank and air is introduced into a combustion chamber and explodes when ignited by a glow plug, thereby sliding in opposite directions a piston inside the combustion chamber, and in which exhaust gas generated by the combustion of the mixed gas is released to the outside through an exhaust port of the combustion chamber, so that uniflow scavenging can reduce the loss of mixed gas and thus raise efficiency, and both the initial ignition enabled by the glow plug and the following compression-ignition type combustion cooperate to increase heat efficiency.

The invention also provides a magnetic suction valve type uniflow scavenging micro-engine, in which mixed gas including fuel and air is introduced into a combustion chamber through inlets at the opposite ends of a cylinder head, which the inlets are automatically opened/closed by the motion of a piston, which the mixed gas (fuel and air) introduced into the combustion chamber is initially ignited by igniters at the opposite ends of the cylinder head, which the force of explosion following the initial ignition moves the piston in the opposite direction to compress the opposite space to the combustion chamber, and which the compressed mixed gas in a cylinder sleeve is successively ignited and exploded by compression ignition, so that uniflow scavenging realized by a simple structure can raise the efficiency of the engine, that the simple structure enabled by the simple linear reciprocation can facilitate the manufacture and improve endurance, and that the piston, the cylinder sleeve, and the cylinder head can be manufactured from a ceramic material having excellent heat insulation and low heat expansion, thereby remarkably improving heat efficiency and endurance.

According to an aspect of the invention for realizing the object, the invention provides a portable power pack, which includes a fuel tank for feeding fuel to outside; a fuel/air supply for mixing fuel, which is supplied from outside, with external air, thereby providing mixed gas, the fuel/air supply stacked on top of the fuel tank; a uniflow scavenging micro-engine for receiving mixed gas from the fuel/air supply and igniting mixed gas to explode; a control panel for operating and controlling the uniflow scavenging micro-engine; and a capacitor battery for powering glow plugs of the control panel and the uniflow scavenging micro-engine, wherein the capacitor battery compensates for a fluctuation in load current occurring from the micro-engine.

The fuel/air supply of the invention includes a fuel inlet unit having an inlet hole in the central portion thereof, the inlet hole communication with an outlet hole of the fuel tank to draw in fuel, and a first impeller coupled to the inlet hole and being rotated by the evaporation pressure of drawn-in fuel; an exhaust gas delivery unit stacked on top of the fuel inlet unit, and having a second impeller in the central portion thereof, wherein the second impeller is rotated by the pressure of exhaust gas, which is fed through the inside of the exhaust gas delivery unit; an air inlet unit stacked on top of the exhaust gas delivery unit, and having a third impeller placed in the central portion thereof to draw in air from outside; a fuel/air mixing unit stacked on top of the air inlet unit, and having a through hole in the position corresponding to the third impeller to introduce air through the third impeller, so that air introduced by the through hole mixes with fuel; and a cover stacked on top of the fuel/air mixing unit, and having connecting holes formed in opposite ends thereof, wherein the connecting holes are connected to the engine to feed fuel.

The uniflow scavenging micro-engine of the invention includes inlet units placed at opposite ends to draw in mixed gas including fuel, fed from the fuel/air supply, and air; glow plugs each stacked on a respective one of the inlet units to red heat an igniter therein, thereby igniting mixed gas; and a combustion chamber having a piston therein, wherein the explosion of mixed gas slides the piston in opposite directions.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The present invention will now be described more fully with reference to the accompanying drawings, in which exemplary embodiments thereof are shown.

Figure 1:
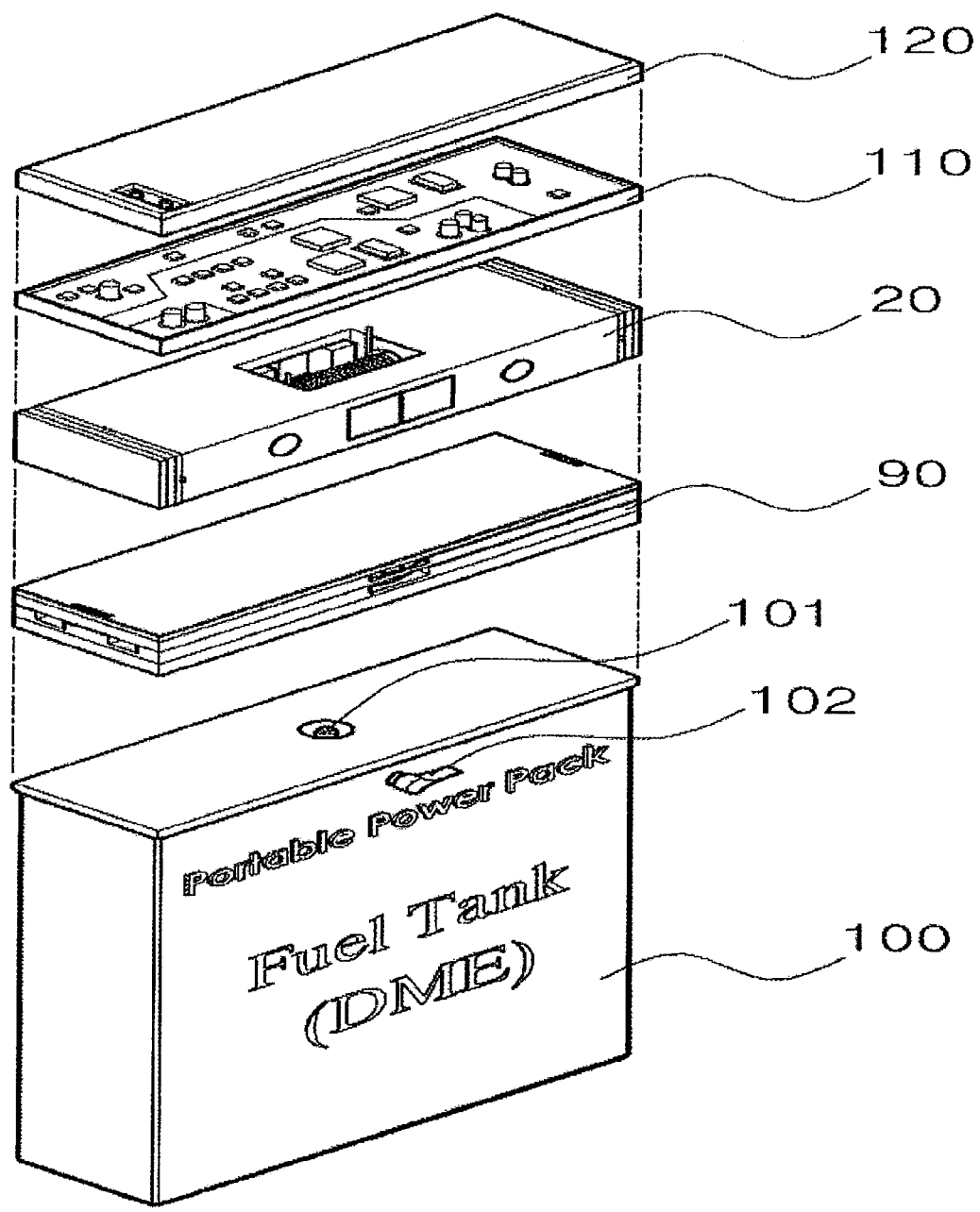
FIG. 1 is an exploded perspective view illustrating a portable power pack according to an embodiment of the invention.
Figure 2:
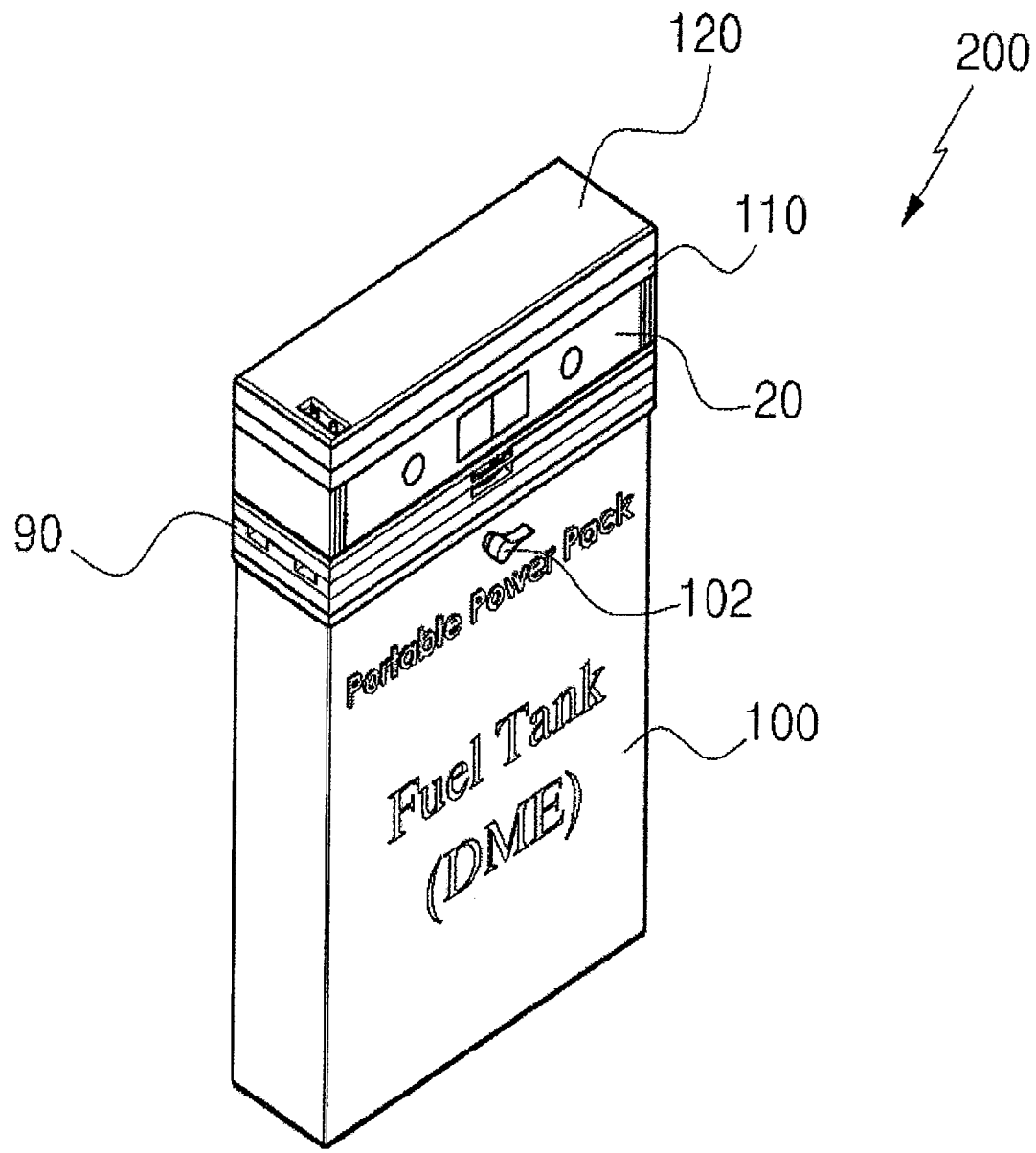
FIG. 2 is an assembled perspective view illustrating the portable power pack of the invention.

FIG. 1 is an exploded perspective view illustrating a portable power pack 200 according to an embodiment of the invention, and FIG. 2 is an assembled perspective view illustrating the portable power pack 200 of the invention.

As shown in FIGS. 1 and 2, the portable power pack 200 of the invention includes a fuel tank 100, a fuel/air supply 90, a uniflow scavenging micro-engine 20, a control panel 110, and a capacitor battery 120.

The fuel tank 100 is able to contain typical dimethyl ether (DME) fuel, the overall size of which is reduced. The fuel tank 100 has an outlet 101, which communicates with the fuel/air supply 90, at the center of the top portion thereof, so that the DME fuel, which is contained in the fuel tank 100, can be fed to the outside. (Hereinafter, the DME fuel will be referred to as "fuel.")

The outlet 101 has an on/off valve 102, which acts to prevent fuel from being fed when the portable power pack 200 is not used. A part of the on/off valve 102 protrudes from one side of the fuel tank 100, on which the outlet 101 is located, so that the user can operate the on/off valve 102.

The control panel 110 acts to operate/control the portable power pack 200. The operation of the control panel 110 can be enabled by a remote controller or by a control button (not shown), which is provided on an outer end of the control panel.

The capacitor battery 120 is provided integrally with or separately from the control panel 110. The capacitor battery 120 stores a predetermined amount of electric power, which can power glow plugs 3 and 6 of the uniflow scavenging micro-engine 20, and compensates for fluctuations in load current, which occur in the uniflow scavenging micro-engine 20.

Figure 3:
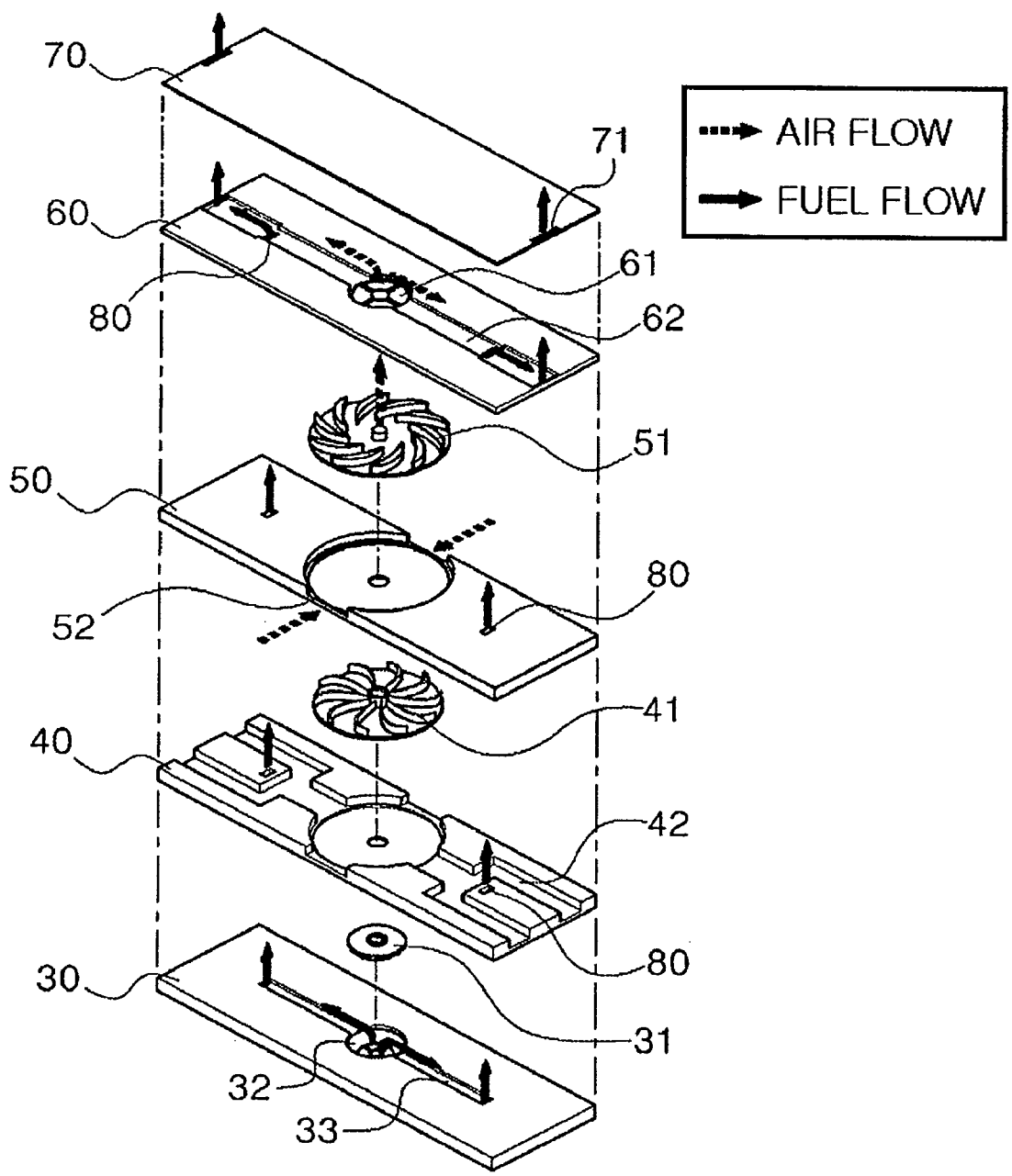
FIG. 3 is an exploded perspective view illustrating the fuel/air supply shown in FIG. 1.
Figure 4:
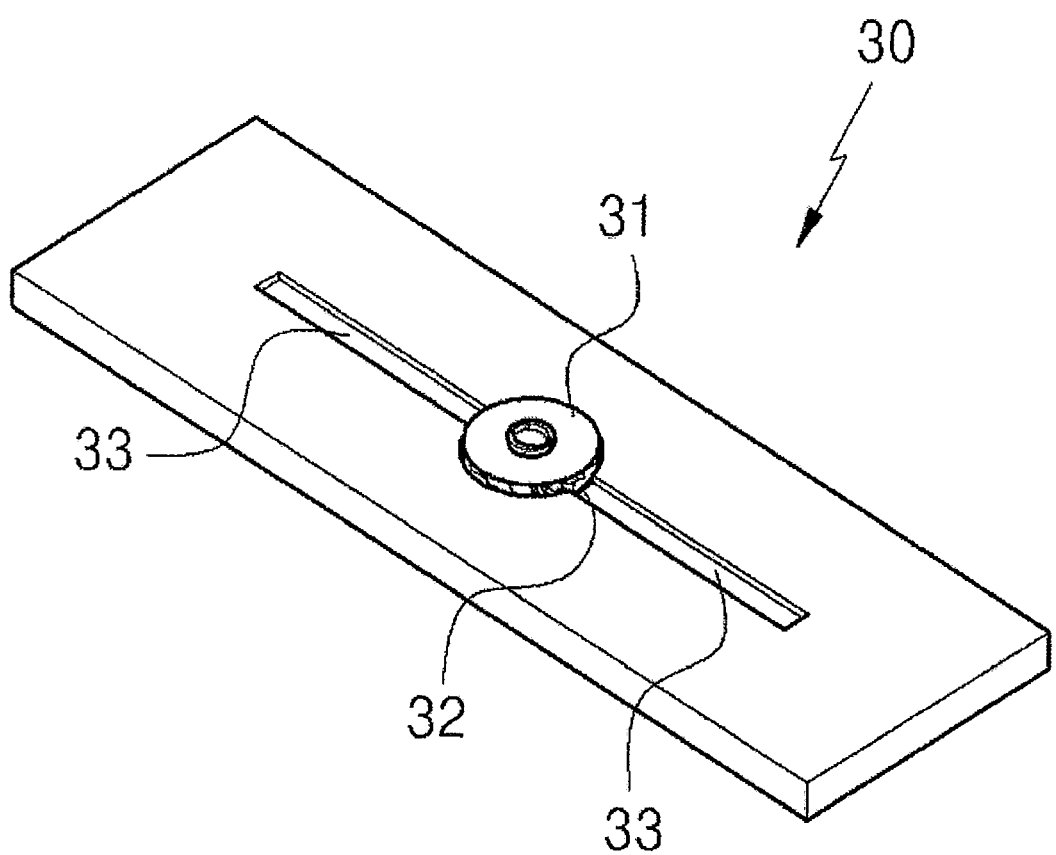
FIG. 4 is a perspective view illustrating the fuel inlet unit shown in FIG. 3.
Figure 5:
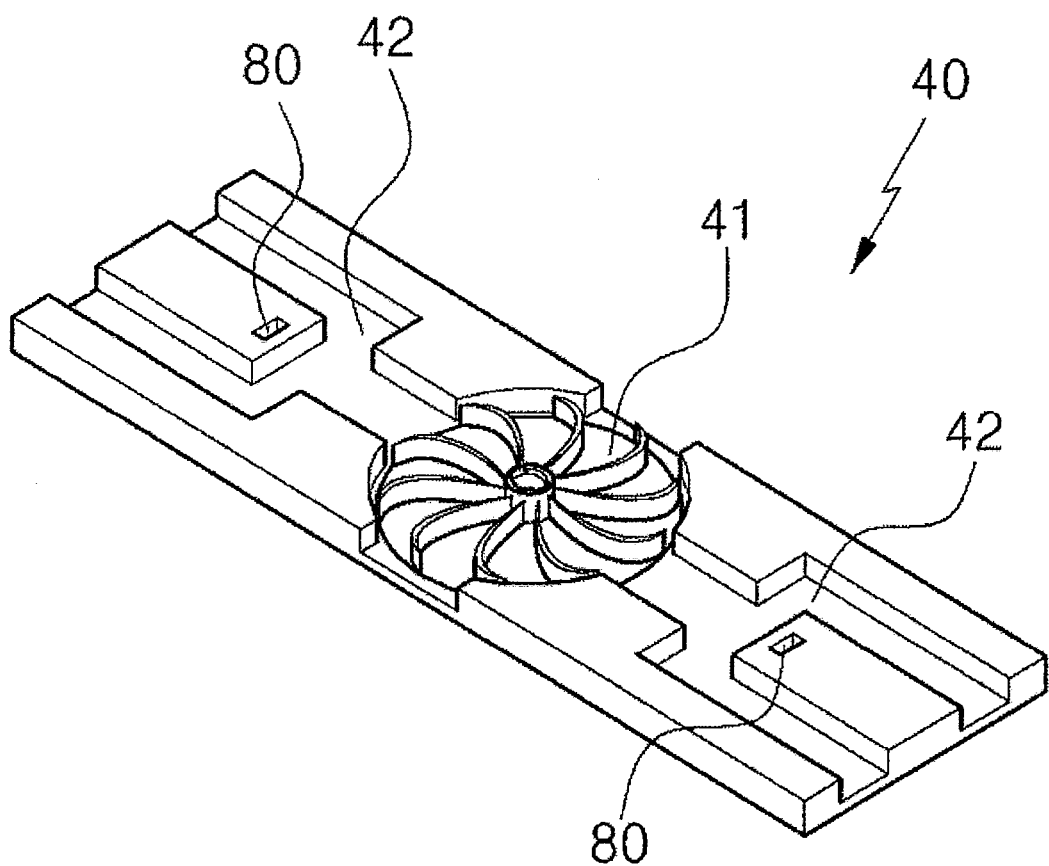
FIG. 5 is a perspective view illustrating exhaust gas delivery unit shown in FIG. 3.
Figure 6:
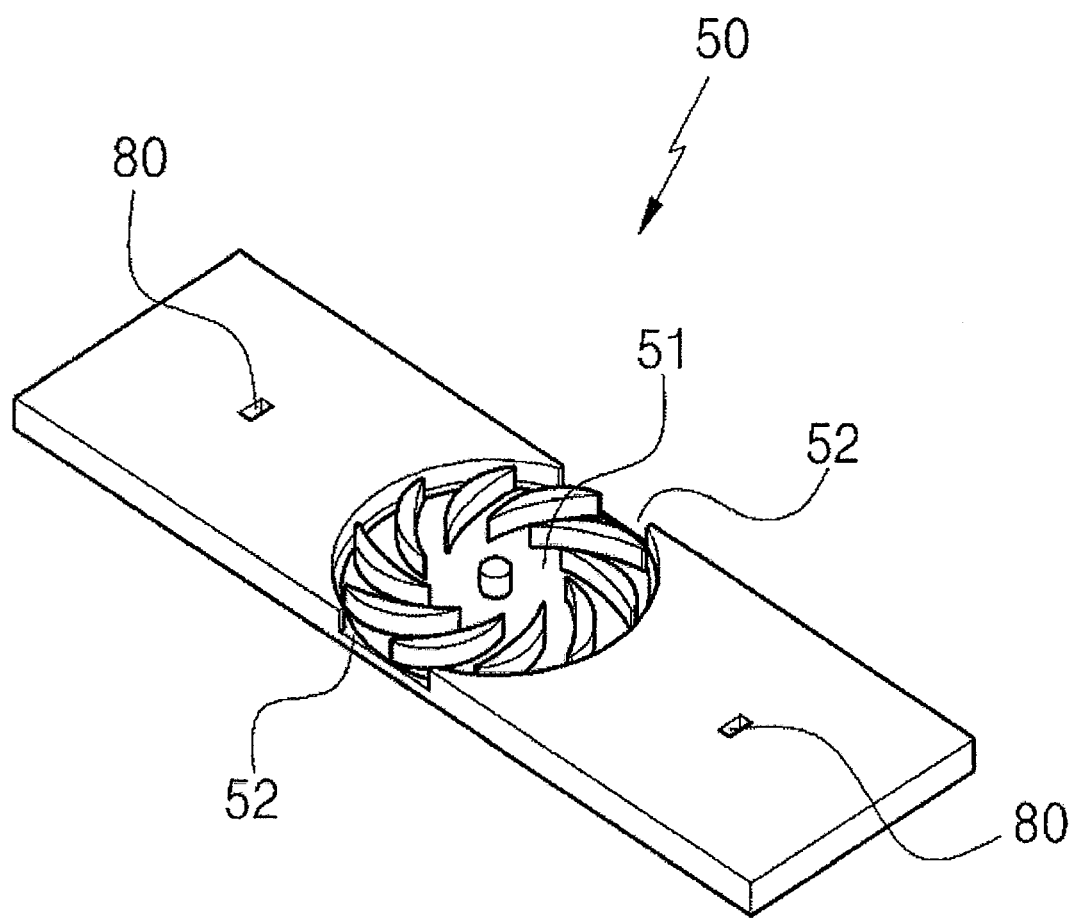
FIG. 6 is a perspective view illustrating the air inlet unit shown in FIG. 3.
Figure 7:
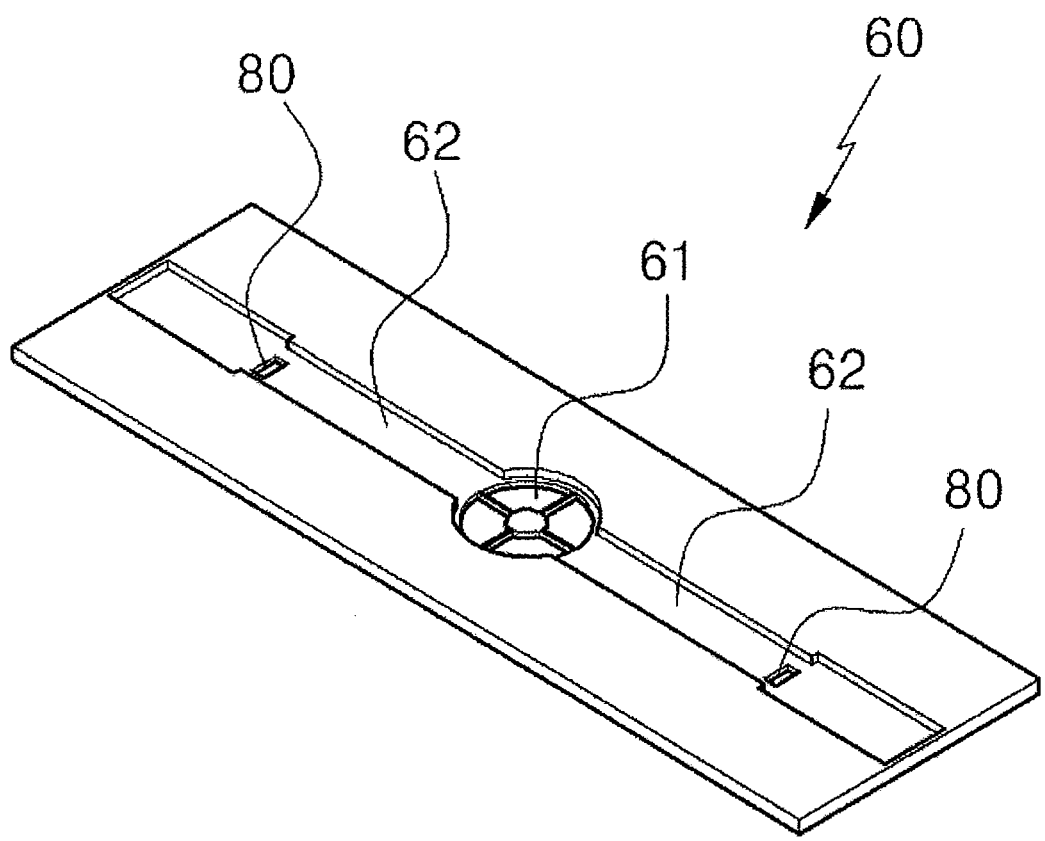
FIG. 7 is a perspective view illustrating the fuel/air mixing unit shown in FIG. 3.
Figure 8:
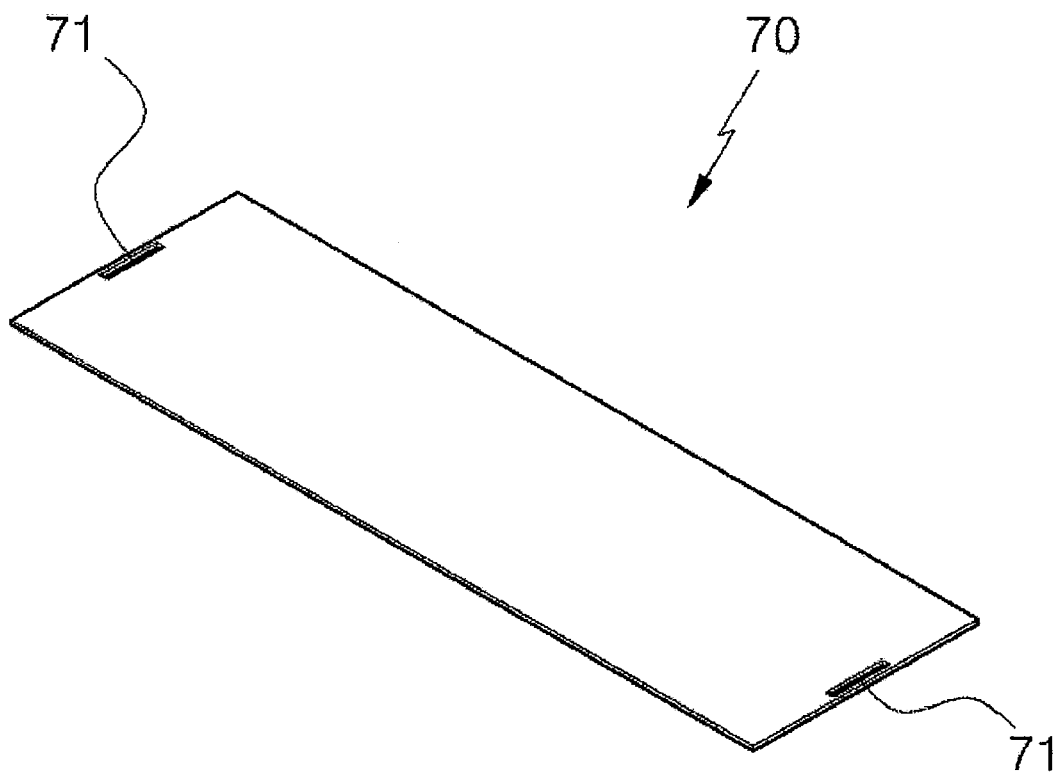
FIG. 8 is a perspective view illustrating the cover shown in FIG. 3.

FIG. 3 is an exploded perspective view illustrating the fuel/air supply 90 shown in FIG. 1, FIG. 4 is a perspective view illustrating a fuel inlet unit 30 shown in FIG. 3, FIG. 5 is a perspective view illustrating an exhaust gas delivery unit 40 shown in FIG. 3, FIG. 6 is a perspective view illustrating an air inlet unit 50 shown in FIG. 3, FIG. 7 is a perspective view illustrating a fuel/air mixing unit 60 shown in FIG. 3, and FIG. 8 is a perspective view illustrating a cover 70 shown in FIG. 3.

As shown in FIG. 3, the fuel/air supply 90 of the invention includes the air inlet unit 30, the exhaust gas delivery unit 40, the air inlet unit 50, the fuel/air mixing unit 60 and the cover 70.

Referring to FIG. 4, the fuel inlet unit 30 has an inlet hole 32, which communicates with the fuel tank to draw in fuel from the fuel tank, at the center thereof. In the fuel inlet unit 30, a first impeller 31 is coupled to the inlet hole 32, and rotates in response to the evaporation pressure of the drawn-in fuel. The rotation of the first impeller 31, which is caused by the evaporation pressure of the fuel, cooperates with the evaporation pressure to deliver the fuel.

In the fuel inlet unit 30, feed grooves 33 are formed spaced apart from each other by a predetermined interval, and extend from the inlet hole 32, which is located at the center of the fuel inlet unit 30, in opposite directions, so that fuel can be introduced through the first impeller 31. The fuel fed through the feed grooves 33 is introduced upward when reaching the ends of the feed grooves 33.

Referring to FIG. 5, the exhaust gas delivery unit 40 is stacked on top of the fuel inlet unit 30. A second impeller 41 is formed at the center of the exhaust gas delivery unit 40 such that exhaust gas can be delivered when the engine is started, and is rotated by the pressure of exhaust gas.

The exhaust gas delivery unit 40 has exhaust gas delivery grooves 42, which extend throughout the exhaust gas delivery unit 40 in a longitudinal direction, so as to be able to deliver exhaust gas. The exhaust gas delivery grooves 42 communicate with the second impeller 41, which is rotated by the pressure of exhaust gas, thereby releasing exhaust gas to the outside. The blades of the second impeller 41 have a specific shape, which can not only facilitate the rotation of the second impeller 41 by the pressure of exhaust gas but also deliver exhaust gas to the right and the left of the exhaust gas delivery unit 40. The second impeller 41 vertically communicates with the first impeller 31, and rotates along with the first impeller 31.

The exhaust gas delivery grooves 42 communicate with the second impeller 41, and are forked near the longitudinal ends of the exhaust gas delivery unit 42. The exhaust gas delivery grooves 42 having this shape are effective to quickly and simply deliver a large amount of exhaust gas.

The exhaust gas delivery unit 40 is provided with communication holes 80, through which exhaust gas can be delivered upward, at the portions where the exhaust gas delivery grooves 42 are forked. The communication holes 80 are located at positions corresponding to distal ends of the feed grooves 33 of the fuel inlet unit 30.

Referring to FIG. 6, the air inlet unit 50 is stacked on top of the exhaust gas delivery unit 40. The air inlet unit 50 has a third impeller 51, which is formed at the center of the air inlet unit 50 and draws air from the outside, and a plurality of air inlet holes 52, which are formed in the outer circumference of the air inlet unit 50 and communicate with the third impeller 51 so as to draw in air from outside.

The blades of the third impeller 51 are bent at a predetermined angle and width so as to deliver the air, which is introduced through the air inlet holes 52 of the air inlet unit 50, in an upward direction. The third impeller 51 is connected to both the first impeller 31 and the second impeller 41, and thus rotates when the first impeller 31 is rotated by the evaporation pressure of the fuel, and when the second impeller 41 is rotated by the pressure of exhaust gas.

Like the exhaust gas delivery unit 50, the air inlet unit 50 has communication holes 80, which are formed at the positions corresponding to the communication holes 80 of the exhaust gas delivery unit 40. When the air inlet unit 50 is stacked on top of the exhaust gas delivery unit 40, the communication holes 80 are vertically connected, so that the fuel can be carried upward.

Referring to FIG. 7, the fuel/air mixing unit 60 is stacked on top of the air inlet unit 50. The fuel/air mixing unit 60 includes a through hole 61, which is formed at the position corresponding to the third impeller 51 in order to draw in the air from the outside through the third impeller 51. In the fuel/air mixing unit 60, the air, which is introduced from the outside through the through hole 61, is mixed with the fuel.

The fuel/air mixing unit 60 also has communication holes 80, which are formed at the positions corresponding to the communication holes 80 of the exhaust gas delivery unit 40 and the air inlet unit 50 in order to draw in and mix the fuel with the air introduced through the through-hole 61.

In the manner, in order to mix the fuel with the air and then to deliver the mixture, the fuel/air mixing unit 60 has mixing grooves 62 connected to the through hole 61. The mixing grooves 62 are formed spaced apart from each other by a predetermined interval, and extend from the through-hole 61 in opposite directions. The communication holes 80 are formed in inner portions (bottoms) of the mixing grooves 62.

Referring to FIG. 8, the cover 70 is stacked on top of the fuel/air mixing unit 60, and has connecting holes 71, which are connected to the engine so as to feed the fuel.

The cover 70 is mounted on the uppermost portion of the fuel/air supply 90, and supports the lower end of the engine, which is placed on top of the cover. In order to sequentially stack the fuel inlet unit 30, the exhaust gas delivery unit 40, the air inlet unit 50, and the fuel/air mixing unit 60 into one unitary body, a coupling unit (not shown) is also provided at one end of the cover 70.

Figure 9:
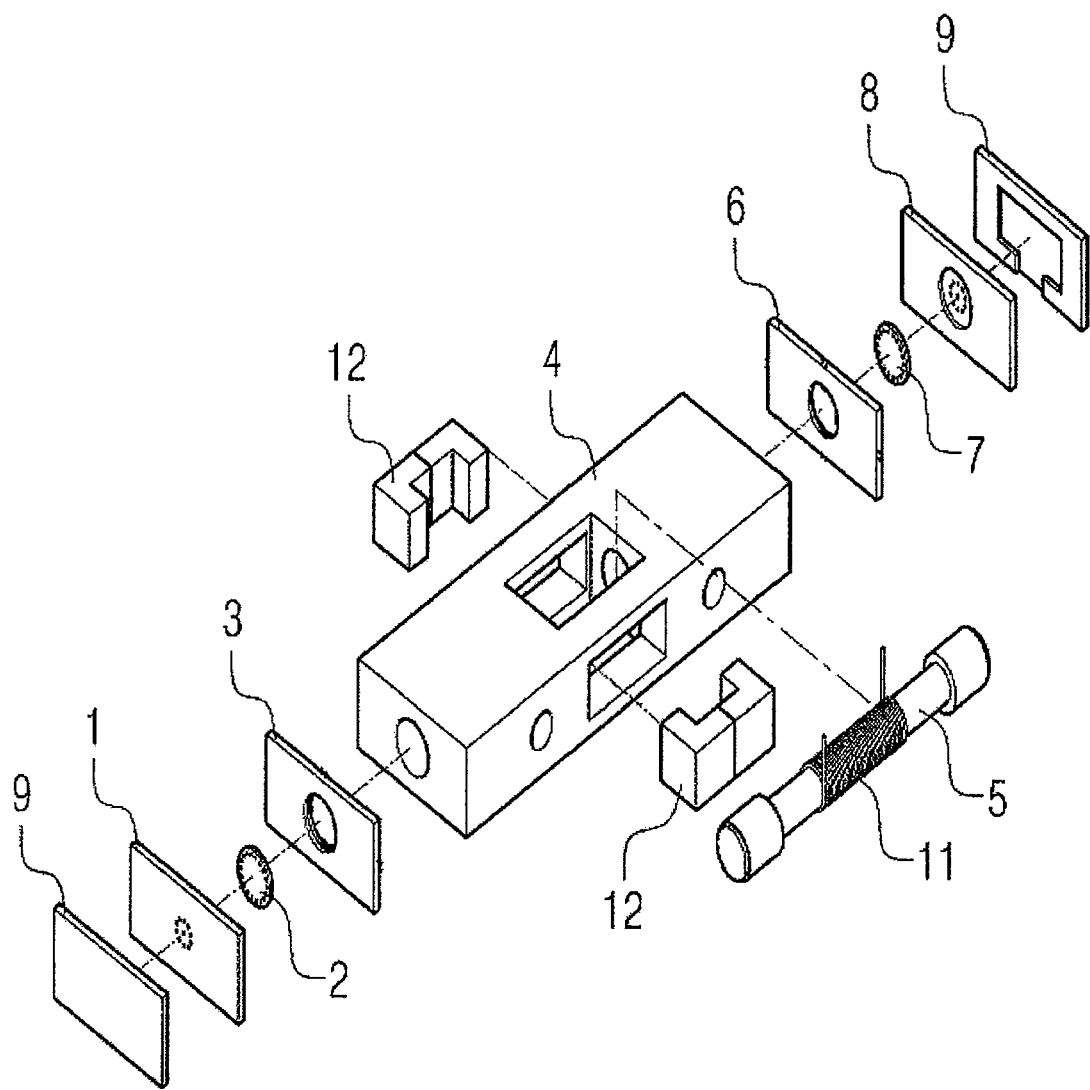
FIG. 9 is an exploded perspective view illustrating the uniflow scavenging micro-engine shown in FIG. 1.
Figure 10:
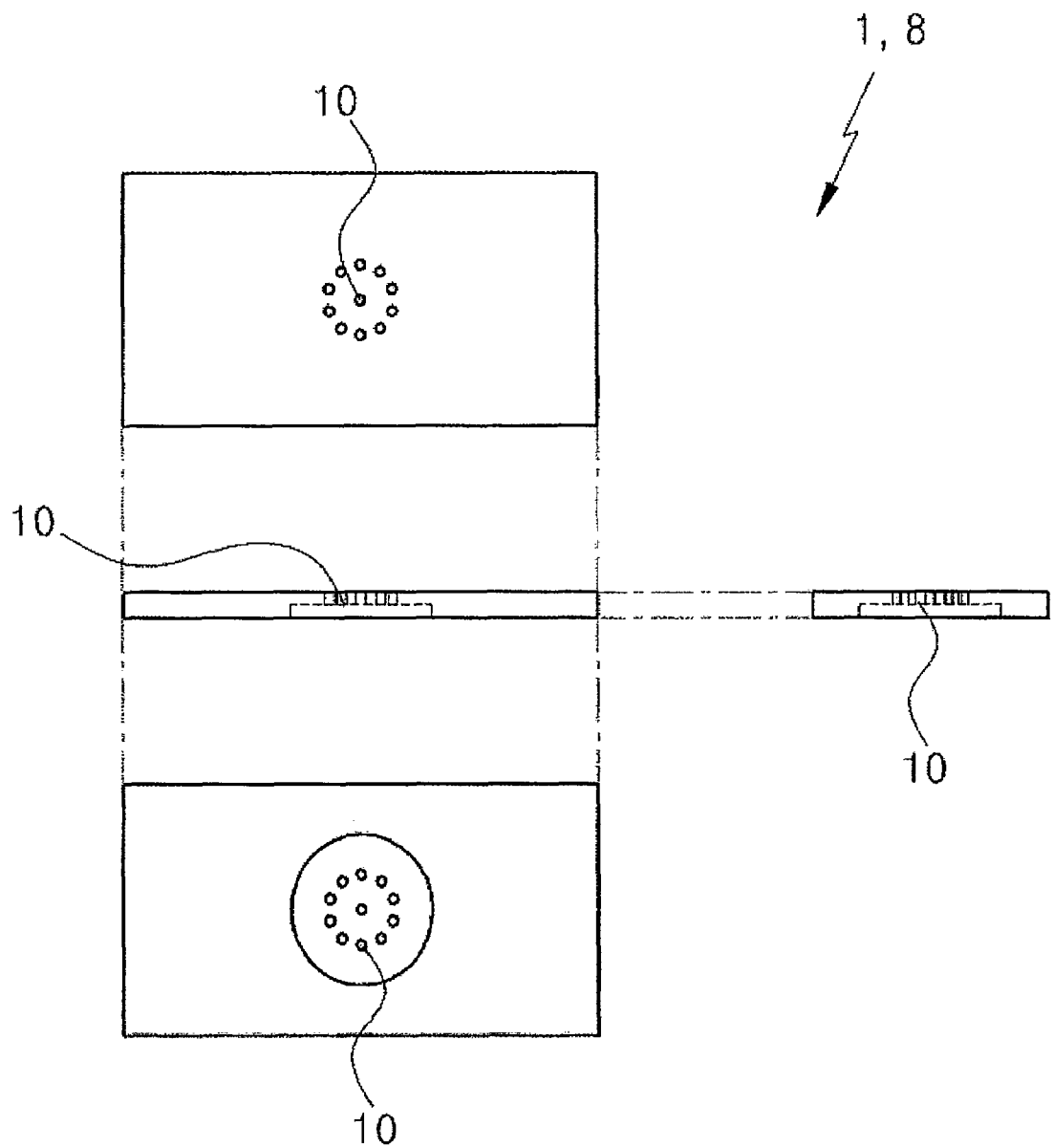
FIG. 10 is a development view illustrating the inlet unit shown in FIG. 9.
Figure 11:
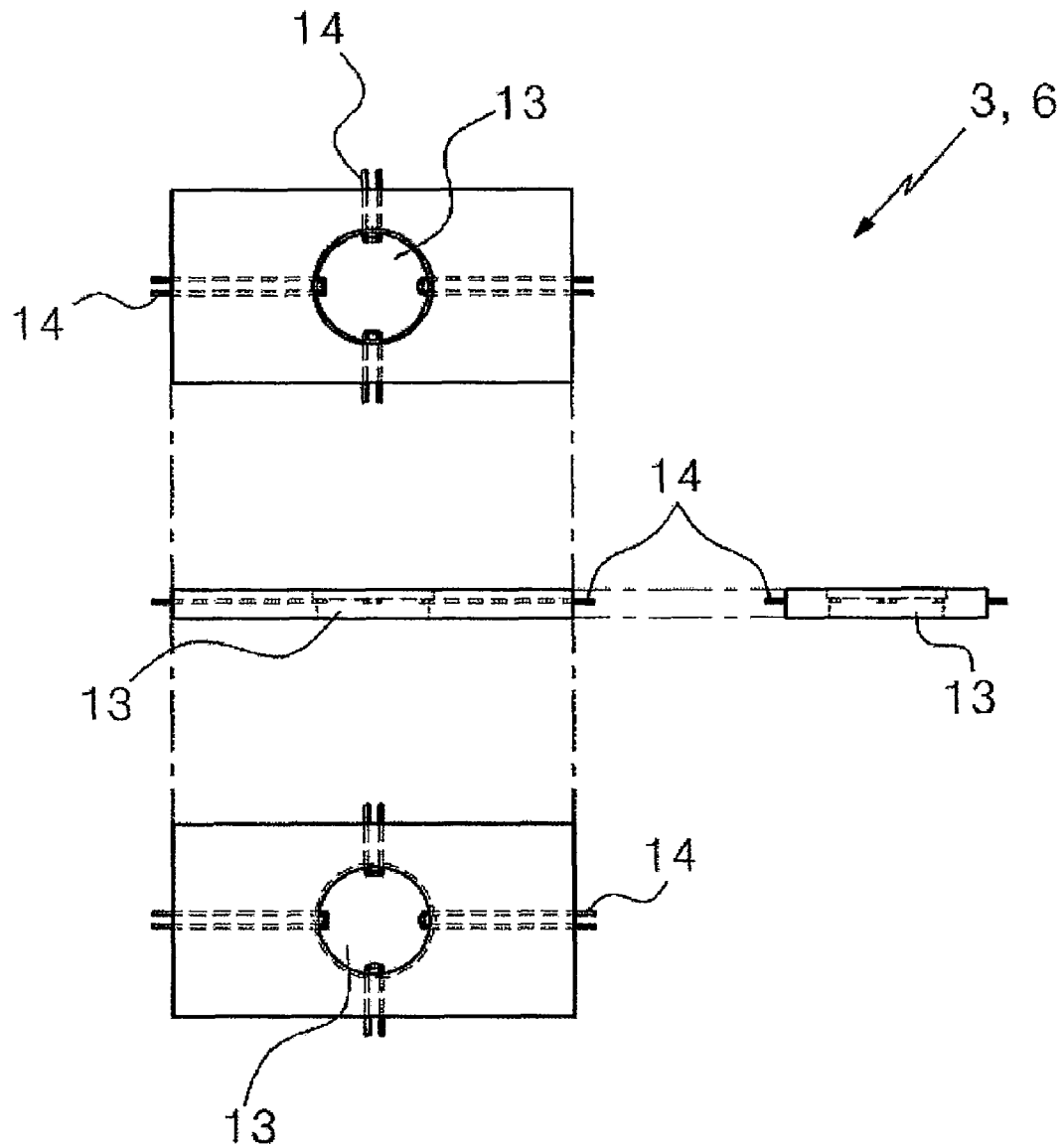
FIG. 11 is a development view illustrating the glow plug shown in FIG. 9.
Figure 12:
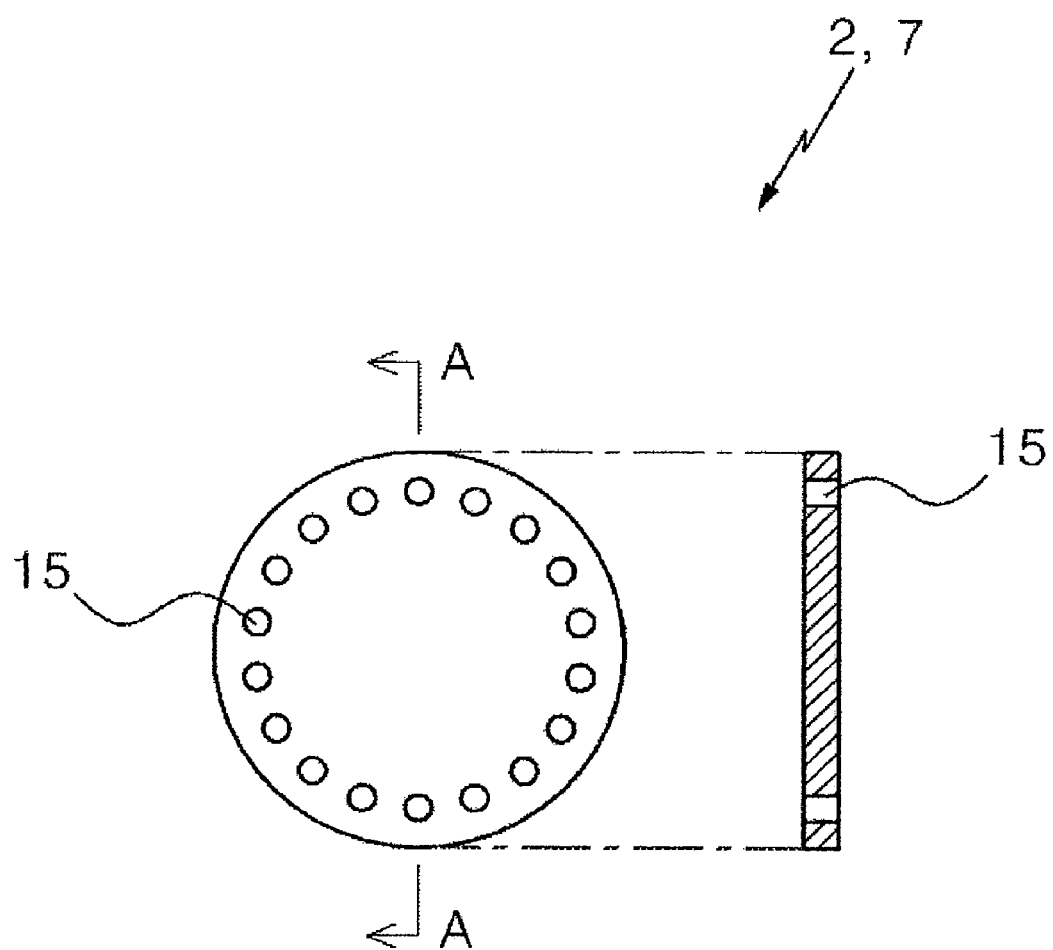
FIG. 12 is a front elevation view illustrating the valve shown in FIG. 9.
Figure 13:
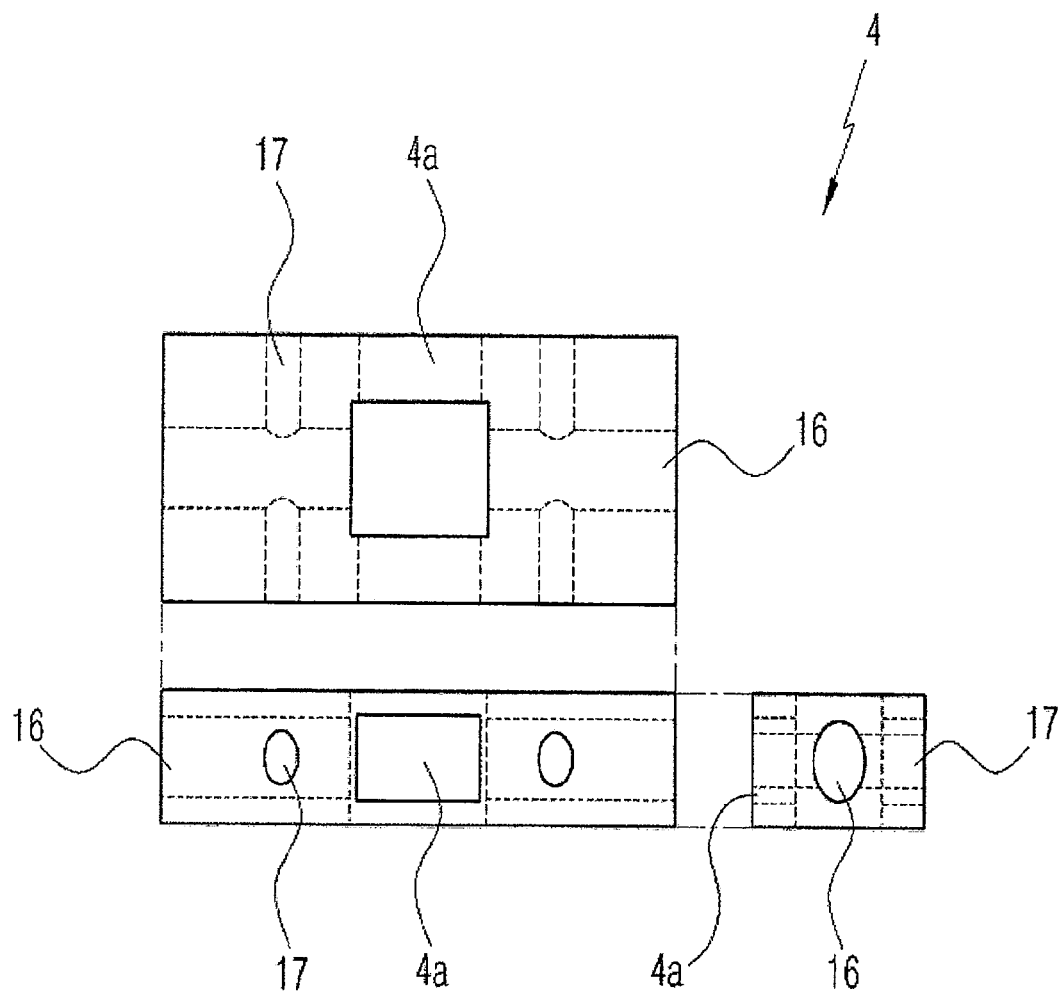
FIG. 13 is a development view illustrating the combustion chamber shown in FIG. 9.
Figure 14:
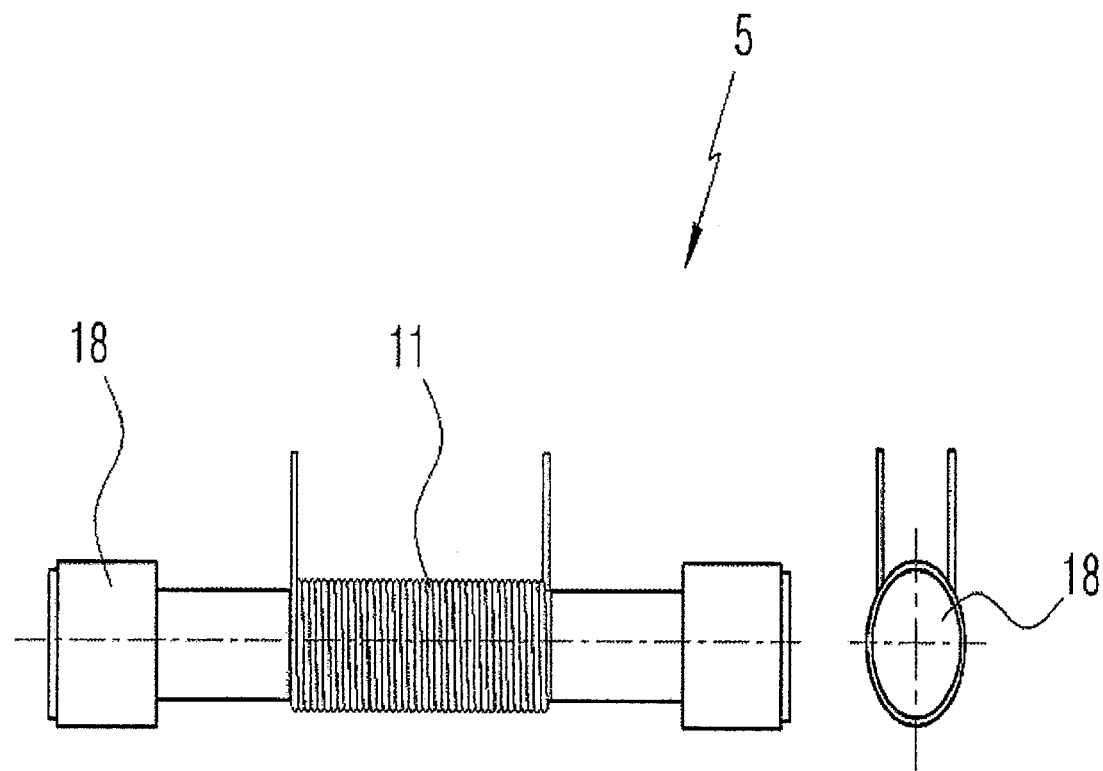
FIG. 14 is a development view illustrating the piston shown in FIG. 9.
Figure 15:
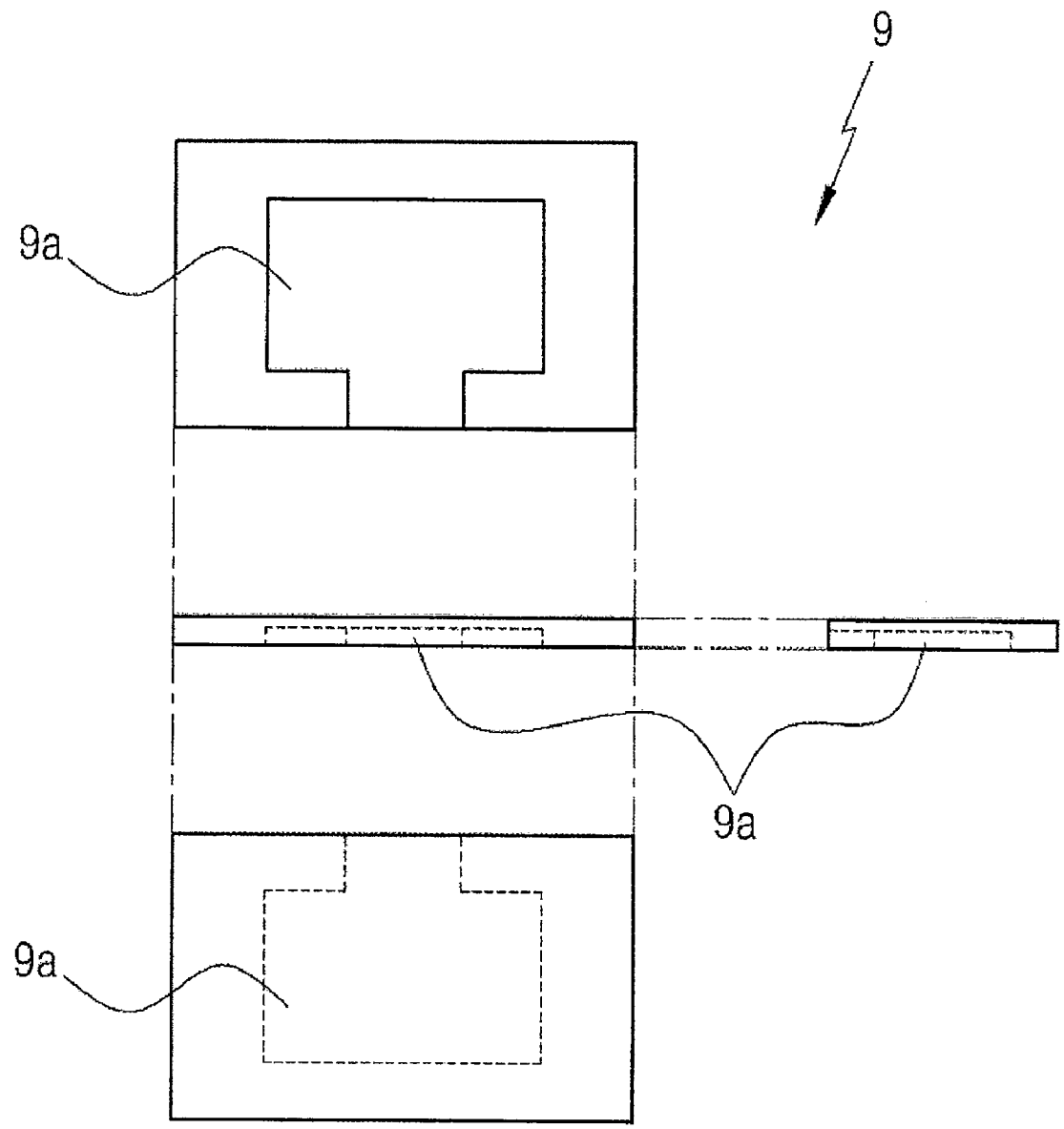
FIG. 15 is a development view illustrating the guide shown in FIG. 9.

FIG. 9 is an exploded perspective view illustrating the uniflow scavenging micro-engine 20 shown in FIG. 1, FIG. 10 is a development view illustrating an inlet unit 1, 8 shown in FIG. 9, FIG. 11 is a development view illustrating a glow plug 3, 6 shown in FIG. 9, FIG. 12 is a front elevation view illustrating a valve 2, 7 shown in FIG. 9, FIG. 13 is a development view illustrating a combustion chamber 4 shown in FIG. 9, FIG. 14 is a development view illustrating a piston 5 shown in FIG. 9, and FIG. 15 is a development view illustrating a guide 9 shown in FIG. 9.

As shown in FIG. 9, the uniflow scavenging micro-engine 20 of the invention includes the inlet units 1 and 8, the guides 9, the valves 2 and 7, the glow plugs 3 and 6 and the combustion chamber 4.

Referring to FIG. 10, the inlet units 1 and 8 face the opposite ends of the combustion chamber 4 in order to draw in the mixed gas, which includes the fuel fed from the fuel tank and the air.

Each of the inlet units 1 and 8 has a plurality of communicating inlet holes 10, which extends from the inner surface to the outer surface of the inlet unit in order to draw in the mixed gas into the combustion chamber 4. The inlet holes 10 have a small diameter in order to increase the pressure of the mixed gas, which includes the mixture of the fuel and the air.

Referring to FIG. 11, each of the glow plugs 3 and 6 is stacked on and coupled to the inner surface of the corresponding one of the inlet units 1 and 8, and acts to ignite the introduced mixed gas by a spark. Each of the glow plugs 3 and 6 has insert holes 13, which are formed at the positions corresponding to the inlet holes 10 of the inlet units 1 and 8. The valves 2 and 7 are installed in the insert holes 13 so as to open/close the insert holes.

Igniters 14 formed in the glow plugs 3 and 6 generate sparks when powered by a capacitor battery (not shown), which is provided outside. One portion of each igniter 14 partly protrudes from the outer surface of the glow plug 3 or 6, and the opposite portion of each igniter 14 extends from the outer surface to the inner surface of the glow plug 3 or 6, and partly protrudes from the inner of the insert hole 13.

The igniters 14 are radially arranged around the insert hole 13, and generate sparks in response to electric current applied thereto, so that the mixed gas (fuel and air) is ignited and exploded.

Referring to FIG. 12, each of the valves 2 and is formed identical to the insert hole 13, and moves in opposite directions in response to internal pressure to release/block the mixed gas including the fuel and the air. In order to release/block the mixed gas, one portion of the valve 2 or 7 repeats contact with and separation from the inlet holes 10 of the inlet units 1 and 8.

Passage holes 15 formed in the valves 2 and 7 allow the fuel to pass through the valves 2 and 7. Particularly, the passage holes 15 are radially arranged around the center of the valve 2 or 7, spaced apart from each other by a predetermined interval.

Referring to FIGS. 9 and 13, the inlet units 1 and 8 and the glow plugs 3 and 6 are coupled, in a stacked fashion, to the opposite ends of the combustion chamber 4, and the guides 9 are coupled to the distal ends of the combustion chamber 4 like a cover. A piston chamber 16 is formed inside the combustion chamber 4, so that the piston 5 can reciprocate in opposite directions in the piston chamber 16. When alternately ignited by the glow plugs 3 and 6, the mixed gas alternately explodes in opposite inside regions of the combustion chamber 4, so that the piston can slide in opposite directions (i.e., make a lateral motion) in the piston chamber 16.

When mixed gas ignited by the glow plugs 3 and 6 explodes, exhaust gas is created in the combustion chamber 4. The combustion chamber 4 has a plurality of exhaust ports 17 communicating from the inner surface of the piston chamber 16 to the outer surface of the combustion chamber 4.

Magnet holes 4a are formed at opposite side portions of the combustion chamber 4, and magnets 14 are stored in the magnet holes 41. In response to the piston 5 reciprocating in opposite directions inside the piston chamber 16, the magnets 14 generate electricity, which in turn charges the capacitor battery 120 or is used in places which need it.

Referring to FIG. 14, the piston 5 is embodied with a shaft, which has piston heads 18 at opposite ends thereof. The piston heads 18 are configured to contact the inner surface of the piston chamber 16 of the combustion chamber 4.

One coil 11 is wound on the outer surface of the shaft of the piston 5, and acts to generate electricity in response to the magnetic field of the magnets 12 when the piston 5 reciprocates in opposite directions.

The starting and end points of the coil 11 are provided above the shaft, and are connected to the capacitor battery 120 or to an outside part.

The ends of the piston heads 18 are shaped flat and made of a material capable of finely standing against impact, so that, when mixed gas ignited by the glow plugs 3 and 6 explodes, the piston 5 can slide in one direction.

Referring to FIG. 15, the guides 9 are provided on the outside of the inlet units 1 and 8. Each of the guides 9 has a guide recess 9a in one surface, particularly, in one surface in contact with the inlet unit 1, 8. The guide recess 9a can draw in mixed gas including fuel and air to the inlet holes 10 of the inlet unit 1, 8.

The guide recess 9a is shaped to draw in mixed gas through the underside of the guide 9, and has a size to cover all the inlet holes 10 of the inlet unit 1, 8, so that mixed gas can be introduced to all the inlet holes 10.

In the uniflow scavenging micro-engine 20, the structure of the inlet units 1 and 8 can be modified so that mixed gas can be delivered by an additional feed unit.

Hereinafter other embodiments of the uniflow scavenging micro-engine will be described more fully with reference to the accompanying drawings.

Figure 16:
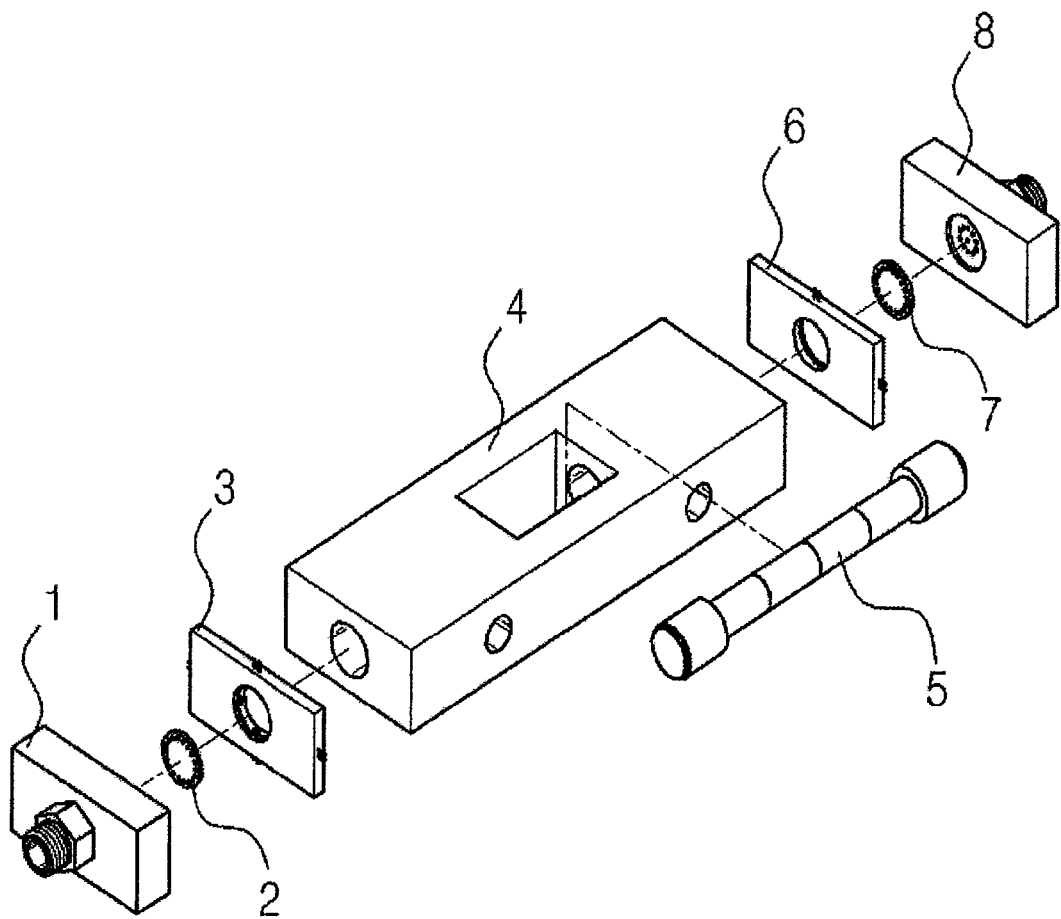
FIG. 16 is an exploded perspective view illustrating a second embodiment of the uniflow scavenging compact engine.
Figure 17:
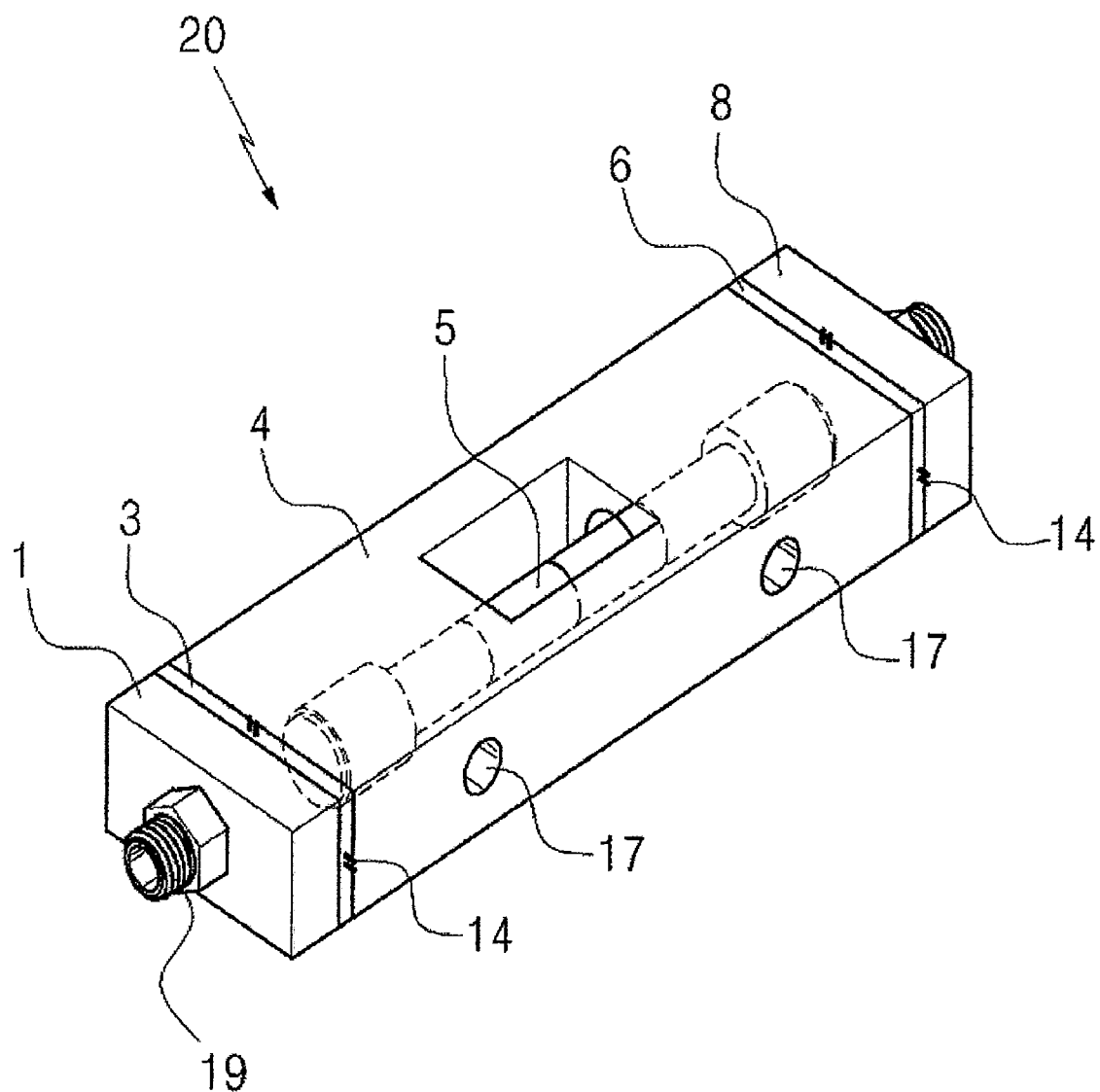
FIG. 17 is an assembled perspective view illustrating the second embodiment of the uniflow scavenging micro-engine.
Figure 18:
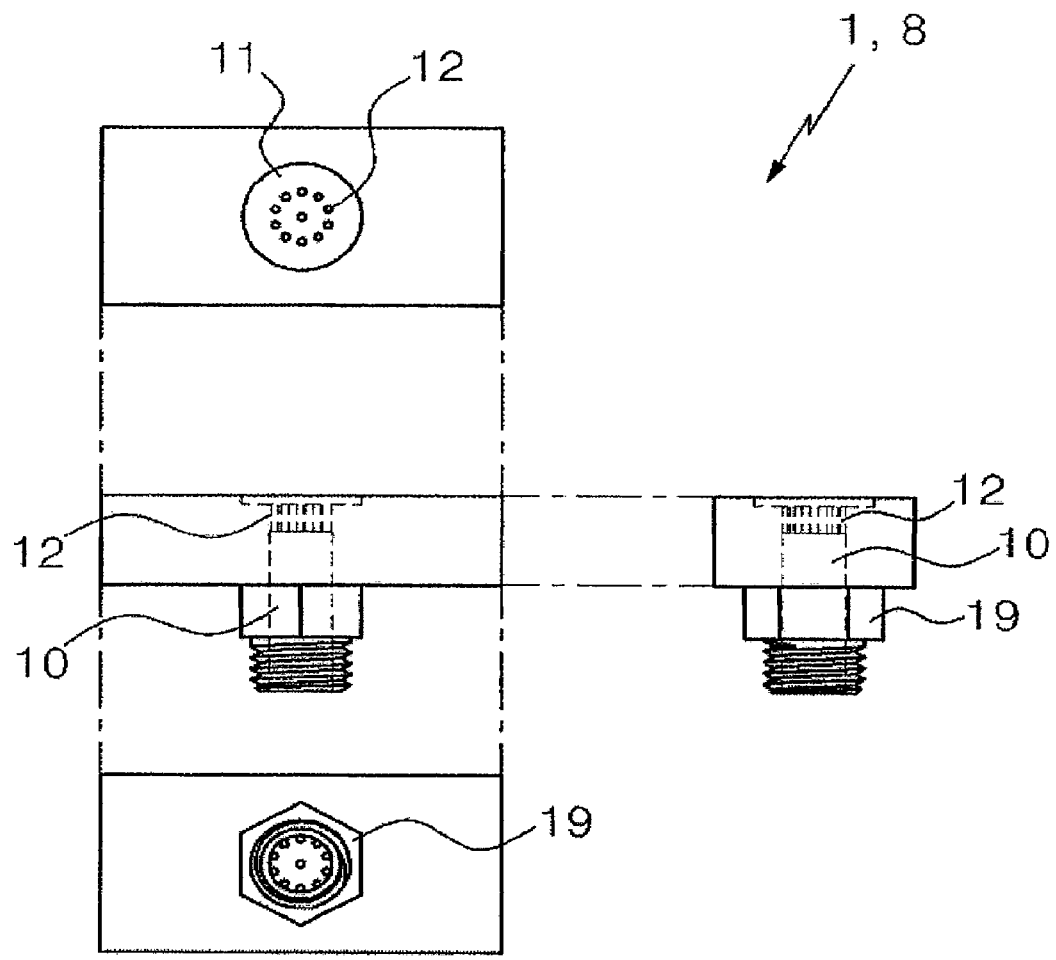
FIG. 18 is a development view illustrating the inlet unit shown in FIG. 16.

FIG. 16 is an exploded perspective view illustrating a second embodiment of the uniflow scavenging compact engine, FIG. 17 is an assembled perspective view illustrating the second embodiment of the uniflow scavenging micro-engine, and FIG. 18 is a development view illustrating the inlet unit shown in FIG. 16.

In the uniflow scavenging micro-engine 20, couplings 19 may protrude from outside ends of the inlet units 1 and 8. The couplings 19 can be coupled with an additional feed unit, which communicates with a fuel tank to feed mixed gas including fuel and air.

In each of the couplings 19 of the inlet units 1 and 8, there is formed an inlet hole 10, which extends from the inner surface to the outer surface of the inlet unit 1, 8, so that fed mixed gas can be introduced into the combustion chamber 4. In the inlet hole 10, there are provided a diaphragm 11, which blocks the inside, and a plurality of fuel feed holes 12, which are radially arranged and spaced at a predetermined distance from the center. It is preferable that the fuel feed holes 12 have a small size to prevent flames created by the explosion of mixed gas from moving from the combustion chamber 4 to the fuel tank (not shown).

Figure 19:
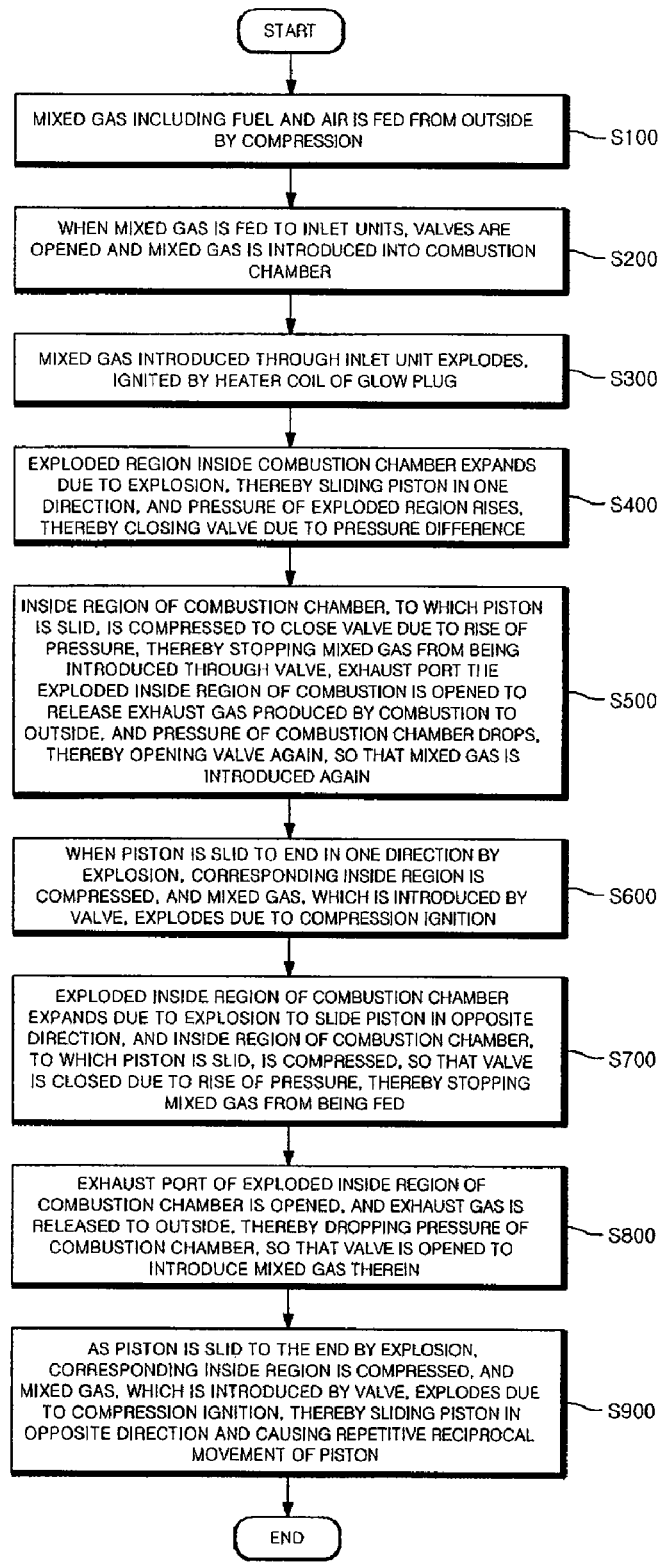
FIG. 19 is a flowchart illustrating a method of operating the second embodiment of the uniflow scavenging micro-engine.

FIG. 19 is a flowchart illustrating a method of operating the second embodiment of the uniflow scavenging micro-engine.

As shown in FIG. 19, according to the method of operating the uniflow scavenging micro-engine 20 of the invention, mixed gas including fuel and air is fed to the inlet units 1 and 8 by compression in S100.

In S200, as mixed gas is fed to the inlet units 1 and 8, the valves 2 and 7 are opened and mixed gas is introduced into the combustion chamber. In S300, mixed gas introduced through the inlet unit 1 explodes, ignited by the igniter 14 of the glow plug 3.

The exploded region inside the combustion chamber 4 expands due to the explosion, thereby sliding the piston 5 in one direction, and the pressure of the exploded region rises, thereby closing the valve 2 due to pressure difference in S400.

In S500, the inside region of the combustion chamber 4, to which the piston 4 is slid, is compressed to close the valve 7 due to the rise of pressure, thereby stopping mixed gas from being introduced through the valve 7, the exhaust port 17 in the exploded inside region of the combustion chamber 4 is opened to release exhaust gas produced by combustion to the outside, and the pressure of the combustion chamber 4 drops, thereby opening the valve 2 again, so that mixed gas is drawn in again.

In S600, when the piston 5 is slid to the end in one direction by the explosion, the corresponding inside region is compressed, and mixed gas, which is introduced by the valve 7, explodes due to compression ignition.

In S700, the exploded inside region of the combustion chamber 4 expands due to the explosion to slide the piston 5 in the opposite direction, and the inside region of the combustion chamber 4, to which the piston 4 is slid, is compressed, so that the valve 2 is closed due to the rise of pressure, thereby stopping mixed gas from being fed.

Accordingly, the exhaust port 17 of the exploded inside region of the combustion chamber 4 is opened, and exhaust gas is released to the outside, thereby dropping the pressure of the combustion chamber 4, so that the valve 7 is opened to draw in mixed gas in S800.

Finally, in S900, as the piston 5 is slid to the end by the explosion, the corresponding inside region is compressed, and mixed gas, which is introduced by the valve 7, explodes due to compression ignition, thereby sliding the piston 5 in the opposite direction. This causes a repetitive reciprocal movement of the piston 5.

When mixed gas is ignited by the igniters 14 of the glow plugs 3 and 6, a greater electric current is selectively applied to one of the glow plugs 3 and 6, so that mixed gas does not concurrently explode at both the glow plugs 3 and 6 but is ignited first by the selected glow plug. After being started up, the igniters 14 can remain red hot without being applied with electricity.

Figure 20:
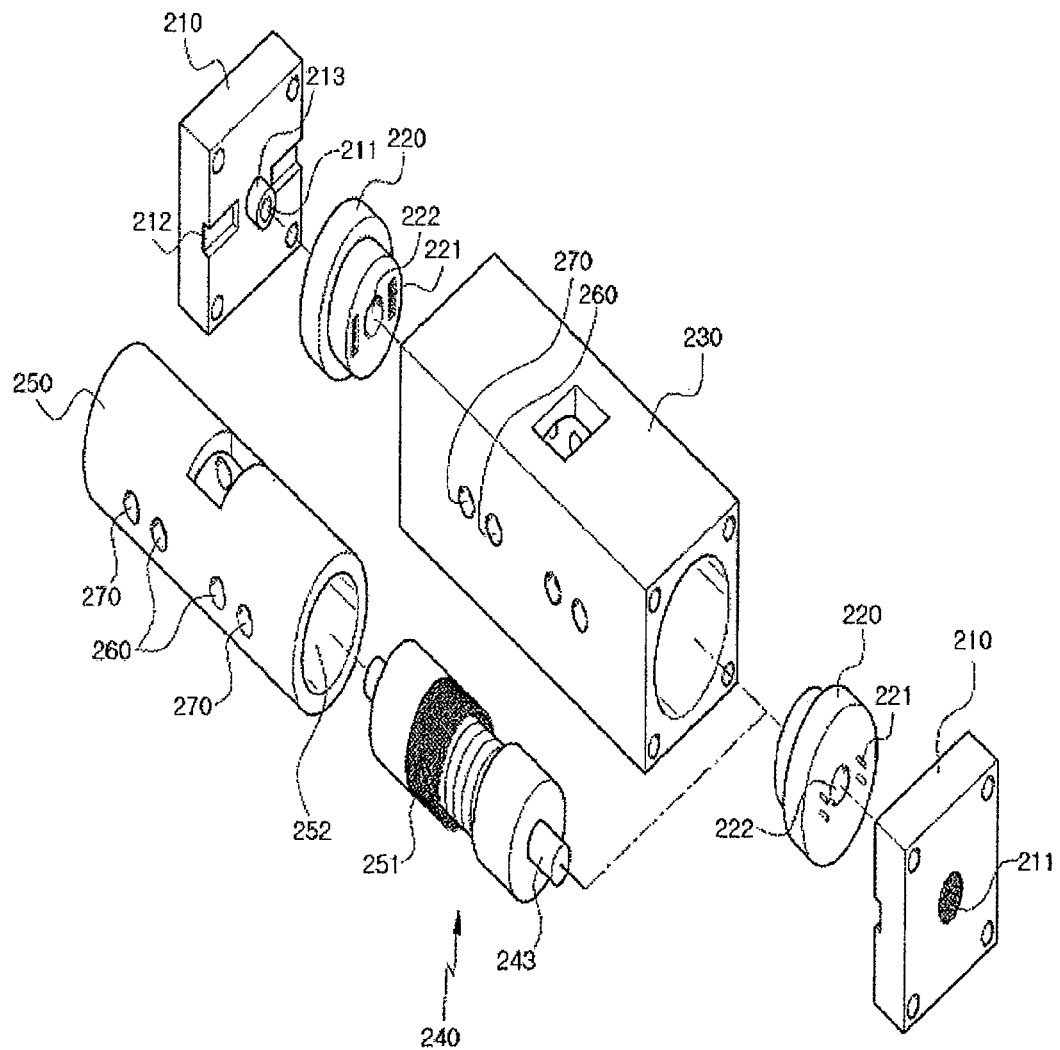
FIG. 20 is an exploded perspective view illustrating the third embodiment of the uniflow scavenging micro-engine.
Figure 21:
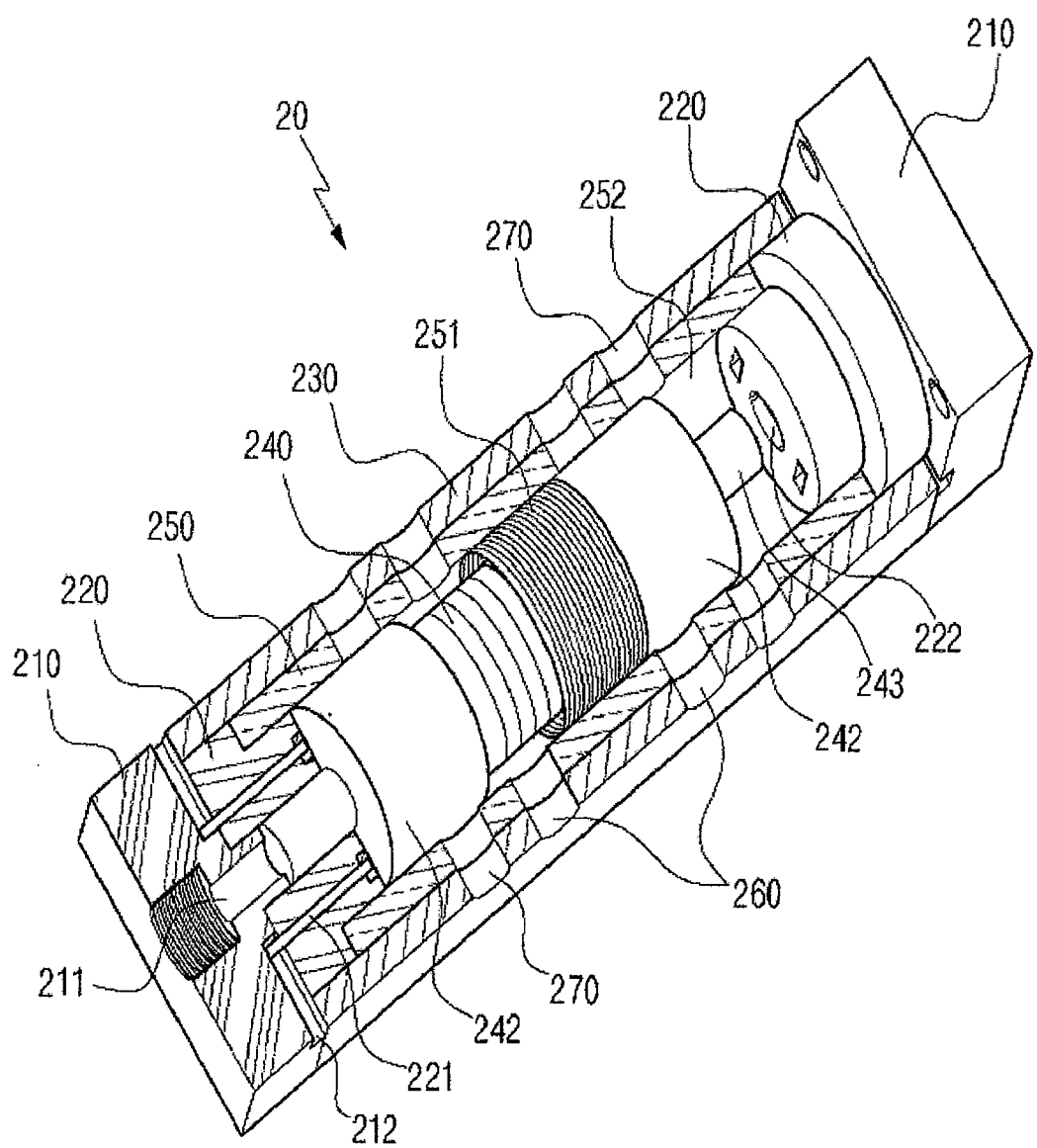
FIG. 21 is an assembled perspective view illustrating the third embodiment of the uniflow scavenging micro-engine.
Figure 22:
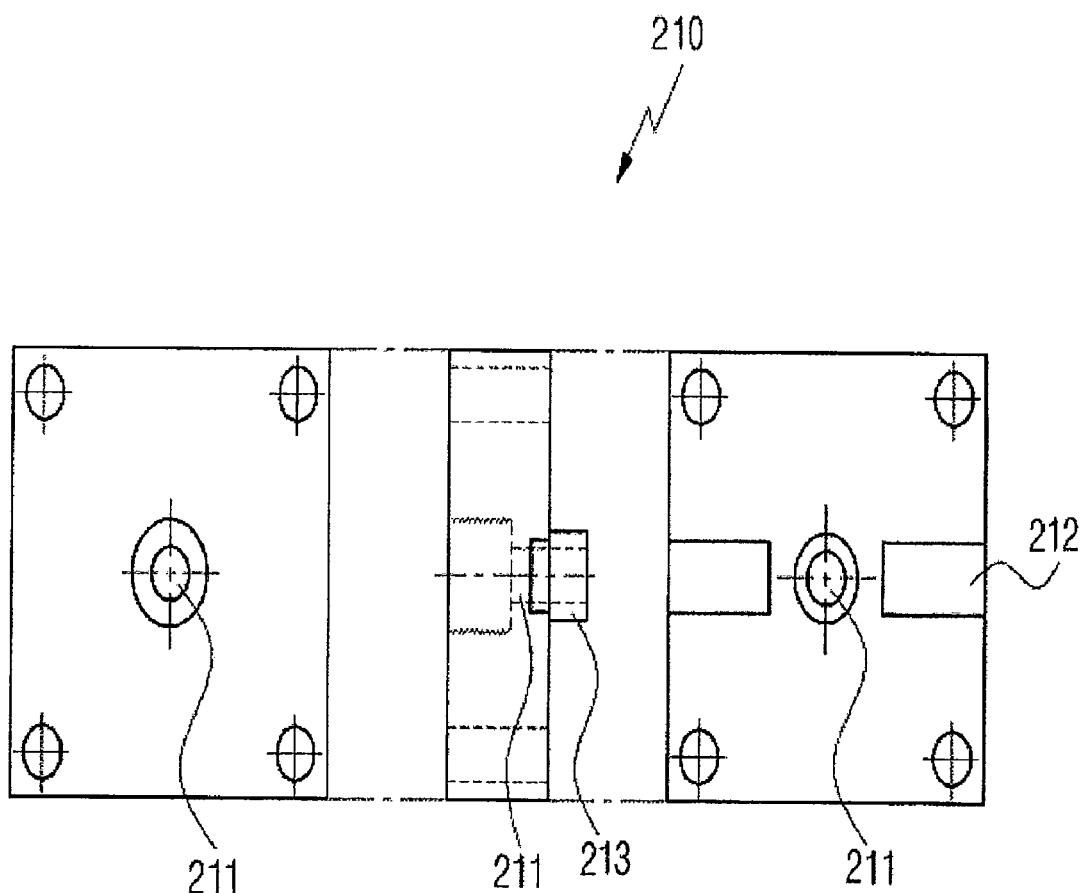
FIG. 22 is a development view illustrating the cylinder block head shown in FIG. 20.

FIG. 20 is an exploded perspective view illustrating a third embodiment of the uniflow scavenging micro-engine, FIG. 21 is an assembled perspective view illustrating the third embodiment of the uniflow scavenging micro-engine, and FIG. 22 is a development view illustrating the cylinder block head shown in FIG. 20.

As shown in FIGS. 20 and 21, the uniflow scavenging micro-engine 20 may include cylinder block heads 210, cylinder heads 220, a cylinder block 230, a piston 240 and a cylinder sleeve 250.

Referring to FIG. 22, the cylinder block heads 210 are provided at opposite ends of the cylinder block 230 in order to draw in mixed gas including fuel and air, fed from a fuel tank (not shown). In the central portion of each of the cylinder block head 210, there is formed an inlet hole 211, which acts to draw in mixed gas, fed from the fuel tank, to the cylinder sleeve 250 through the cylinder head 220. In the inner surface of the inlet hole 211, there are formed female threads for engaging with a feed unit, which feeds mixed gas from the outer fuel tank.

The cylinder block head 210 has a coupling protrusion 213 extending from a surface thereof, which in contact with a corresponding one of the cylinder heads 220, so that the cylinder block head 210 can couple with the cylinder head 220. The coupling protrusion 213 protrudes at a predetermined interval from the outer surface of the inlet hole 211.

Terminal sections 212 are formed in the contact surface of the cylinder block head 210, so that the distal ends of igniters 221 of the cylinder head 220 can be connected with an outer battery (not shown) by electric lines (not shown) inserted into the terminal sections 212. The terminal sections 212 are connected with the outer surface of the block head 210, and the electric lines are inserted into the terminal sections 212.

Figure 23:
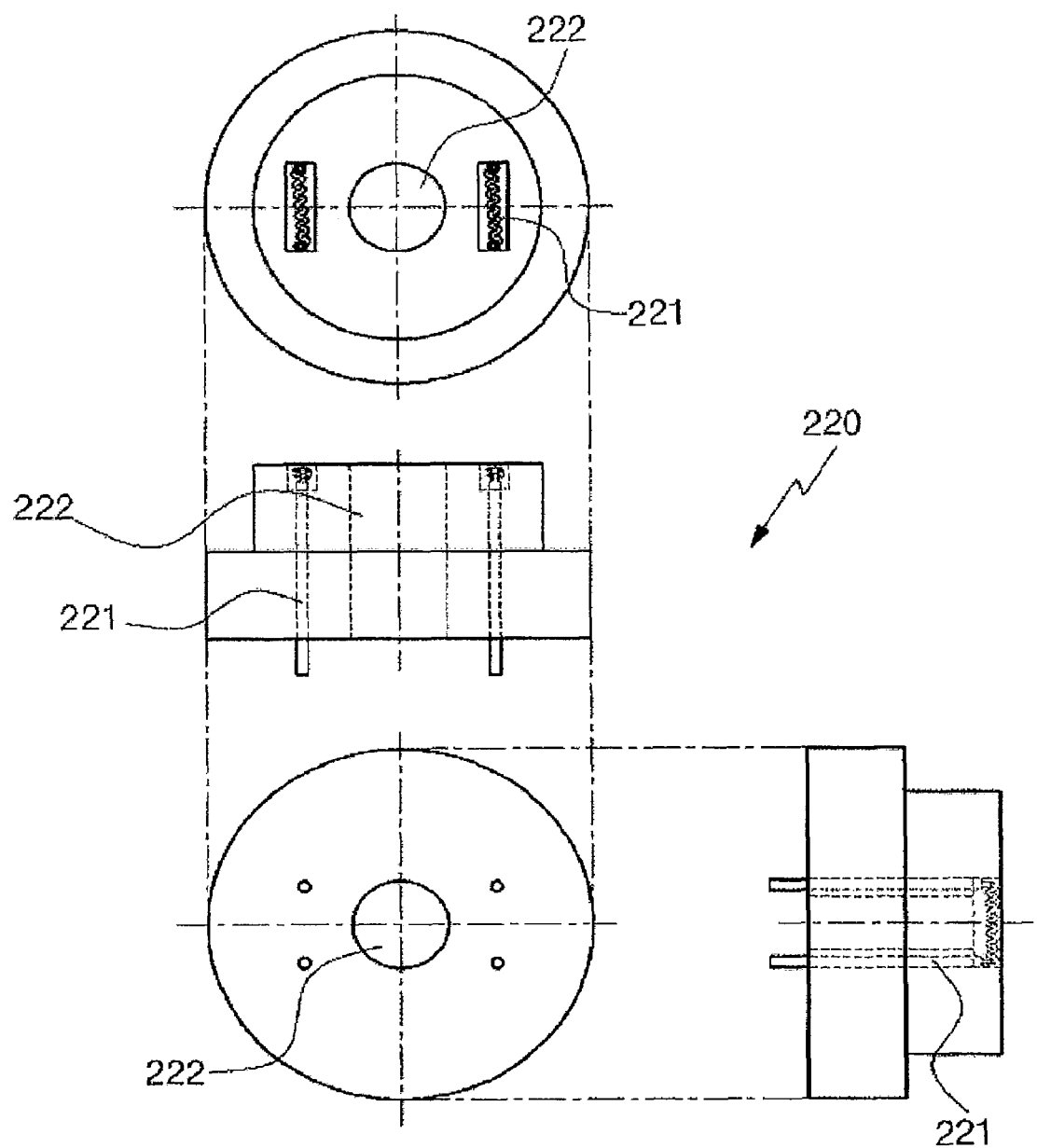
FIG. 23 is a development view illustrating the cylinder head shown in FIG. 20.

FIG. 23 is a development view illustrating the cylinder head 220 shown in FIG. 20. As shown in FIG. 23, the cylinder heads 220 are inserted into the cylinder block 230, in a state stacked on the opposite ends of the cylinder sleeve 250. In the central portion of the cylinder head 220, there is formed an inlet hole 222 to draw in mixed gas into the cylinder sleeve 250 through the cylinder head 220. The inlet hole 221 is formed in a position corresponding to the inlet hole 211 of the cylinder block head 210, and mixed gas is ignited when the igniters 221 are red hot.

The igniters 221 of the cylinder head 220 are red hot by electric current, supplied through the electric lines from an outer battery (not shown). Each of the igniters 221 extends through the inside of the cylinder head 220, one end of the igniter 221 is embodied with a coil and is formed inside the cylinder sleeve 250, and the opposite end of the igniter 221 is embodied with terminals, which protrude at a predetermined interval in the direction, in which the cylinder head 220 contacts the cylinder block head 210, to be connected with the electric lines.

Here, the igniters 221 (e.g., two igniters 221) are separated from each other, placed on both sides of (the coupling protrusion 213 of) the cylinder block head 210. When the igniters 221 become red hot by electric current, mixed gas (including fuel and air) is ignited and explodes.

One end of the cylinder head 220 is inserted into the cylinder block 230, and the cylinder block head 210 is stacked on the opposite end of the cylinder head 220. The cylinder block head 210 is stacked on the cylinder head 220, with the coupling protrusion 213 of the cylinder block head 210 inserted into the inlet hole 22 of the cylinder head 220. The cylinder block head 210 is securely fixed, at one end thereof, to the cylinder block head 230 by coupling members (not shown) such as a bolt.

Figure 24:
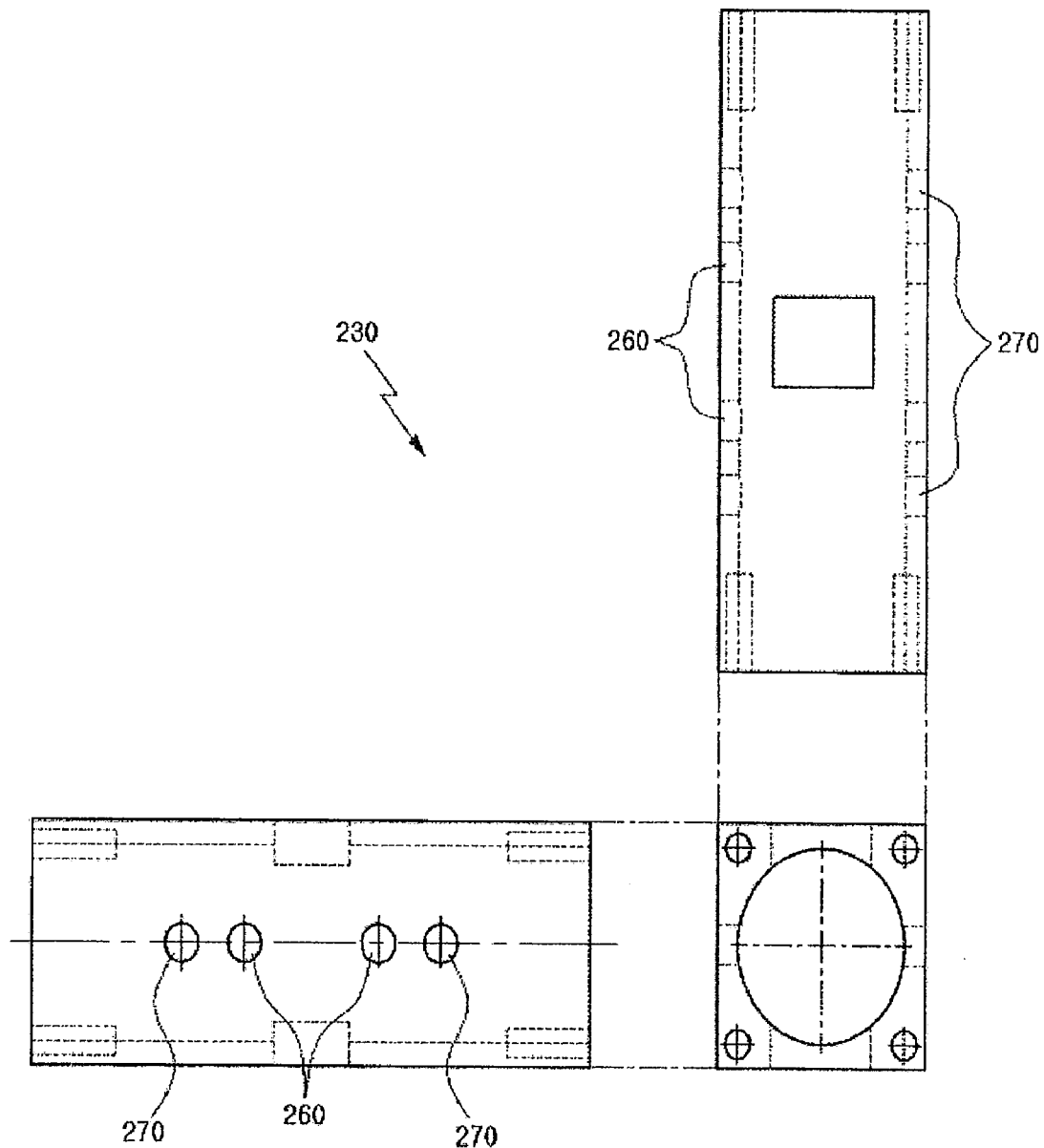
FIG. 24 is a development view illustrating the cylinder block shown in FIG. 20.
Figure 25:
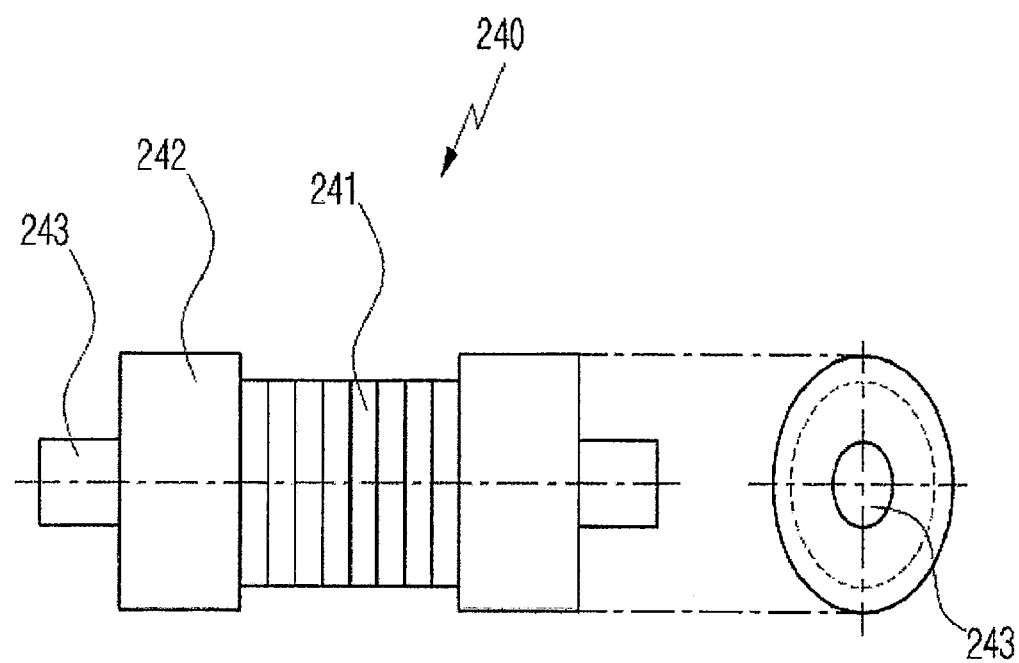
FIG. 25 is a front elevation view illustrating the piston shown in FIG. 20.
Figure 26:
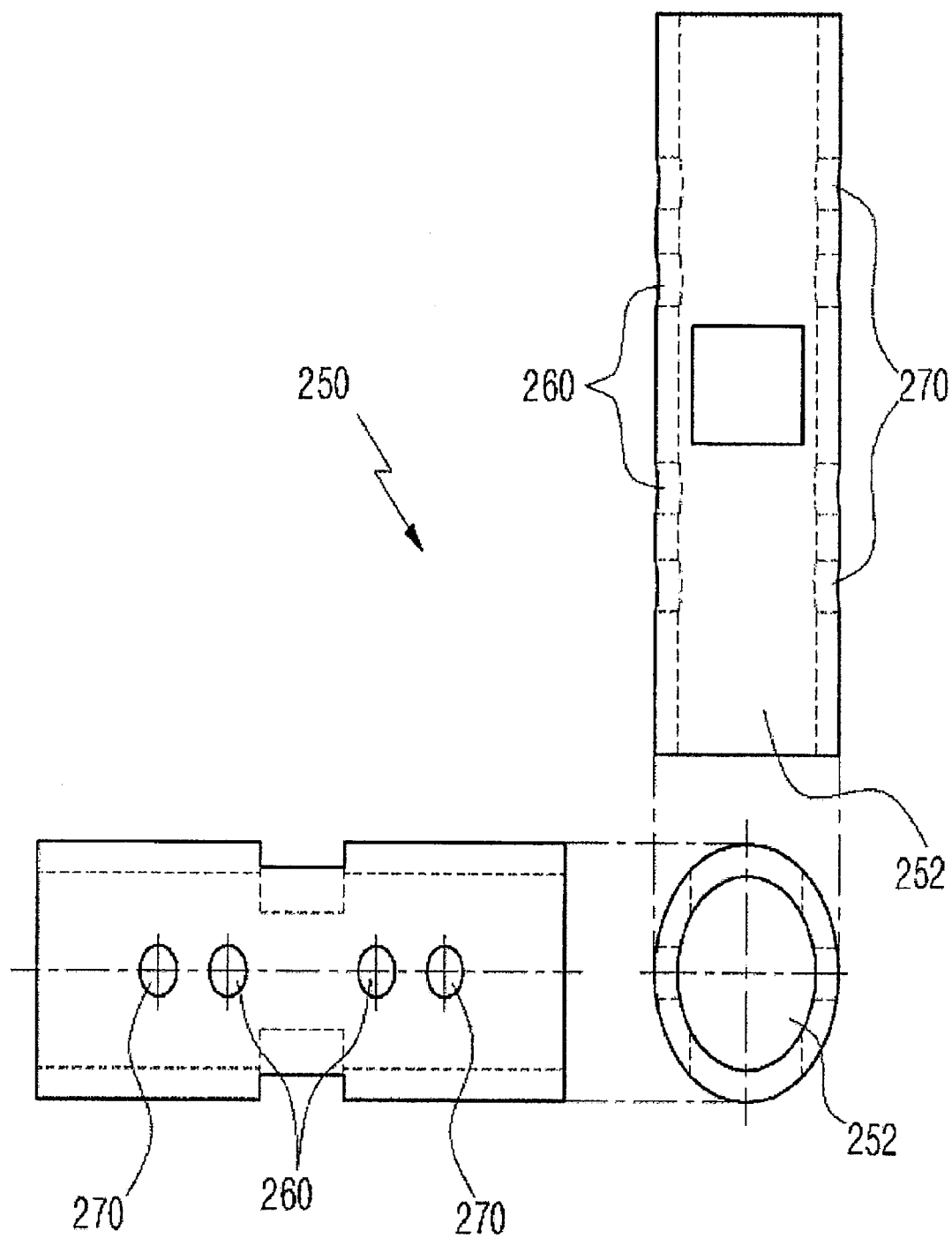
FIG. 26 is a development view illustrating the cylinder sleeve shown in FIG. 20.

FIG. 24 is a development view illustrating the cylinder block shown in FIG. 20; FIG. 25 is a front elevation view illustrating the piston shown in FIG. 20; and FIG. 26 is a development view illustrating the cylinder sleeve shown in FIG. 20.

As shown in FIG. 24, the cylinder block heads 210 and the cylinder heads 220 are coupled, in a stacked state, to the opposite ends of the cylinder block 230. The cylinder sleeve 250 is coupled with the inside of the cylinder block 230, and has a piston chamber 252. The piston 240 is disposed inside the piston chamber 252, so that the piston can reciprocate in opposite directions. When mixed gas is alternately ignited by the cylinder heads 220 to alternately explode in opposite inside regions of the cylinder block 230, the piston 240 reciprocally slides (i.e., performs piston movement) inside the piston chamber 252.

A plurality of air circulation ports 260 is formed in the cylinder sleeve 250, extending from the outer surface of the cylinder sleeve 250 to the piston chamber 252, so that air can circulate inside the cylinder sleeve 250. The air circulation ports 260 are arranged on both sides of the cylinder sleeve 250 with respect to the center of the length thereof, separated from each other at a predetermined interval.

A plurality of exhaust ports 270 are arranged at a predetermined interval in the length direction from the air circulation ports 260. The exhaust ports 270 are configured to release exhaust gas, which is created from the explosion of mixed gas in the cylinder sleeve 250, caused by the cylinder heads 220. The exhaust ports 270 are formed in preset positions, so that, when the piston 240 slides in opposite directions inside the cylinder sleeve 250, one of the exhaust ports 270 is blocked by the piston 240.

Referring to FIG. 25, the piston 240 is embodied with a shaft, which has a magnet 241 in the central portion thereof and piston heads 242 at opposite ends thereof. The piston heads 242 are configured to contact the inner surface of the piston chamber 252 of the cylinder sleeve 250. The ends of the piston heads 242 are shaped flat and made of a material capable of finely standing against impact, so that, when mixed gas ignited by the cylinder head 220 explodes, the piston 240 can slide in one direction.

Protrusions 243 protrude at a predetermined interval from opposite end faces of the piston heads 242, and are configured to release/block mixed gas, which is introduced through the cylinder heads 220 in response to the piston 240 sliding inside the piston chamber 252 of the cylinder sleeve 250. In the case of releasing/blocking mixed gas, each of the protrusions 243 is inserted to a position adjacent to the inlet hole 222 of the cylinder head 220 to block mixed gas, and is detached from the inlet hole 222 to draw in mixed gas into the cylinder sleeve 250.

Referring FIG. 26, the cylinder sleeve 250 is in the shape of a hollow column, and is disposed inside the cylinder block 230. Inside the cylinder sleeve 250, there is formed a piston chamber 252, in which the piston 240 is stored and set slidable in opposite directions.

The cylinder heads 220 are stacked to opposite ends of the cylinder sleeve 250, and fixedly coupled to the inside of the cylinder block 230.

A coil 251, wound in several plies, is inserted into the piston chamber 252 of the cylinder sleeve 250, and is disposed in the center of the piston chamber 252, in which the shaft of the piston 240 extends through the coil 251. The coil 251 generates electric energy from the magnetic force of the magnet 241 in response to the repetitive sliding of the piston 240, and the electric energy is transferred to an outer battery (not shown) and the like.

The cylinder sleeve 250 also has air circulation ports 260 and exhaust ports 270, the position and the number of which are the same as those of the air circulation ports 260 and the exhaust ports 270 of the cylinder block 230.

Hereinafter a method of operating the third embodiment of the uniflow scavenging micro-engine will be described more fully with reference to the accompanying drawing.

Figure 27:
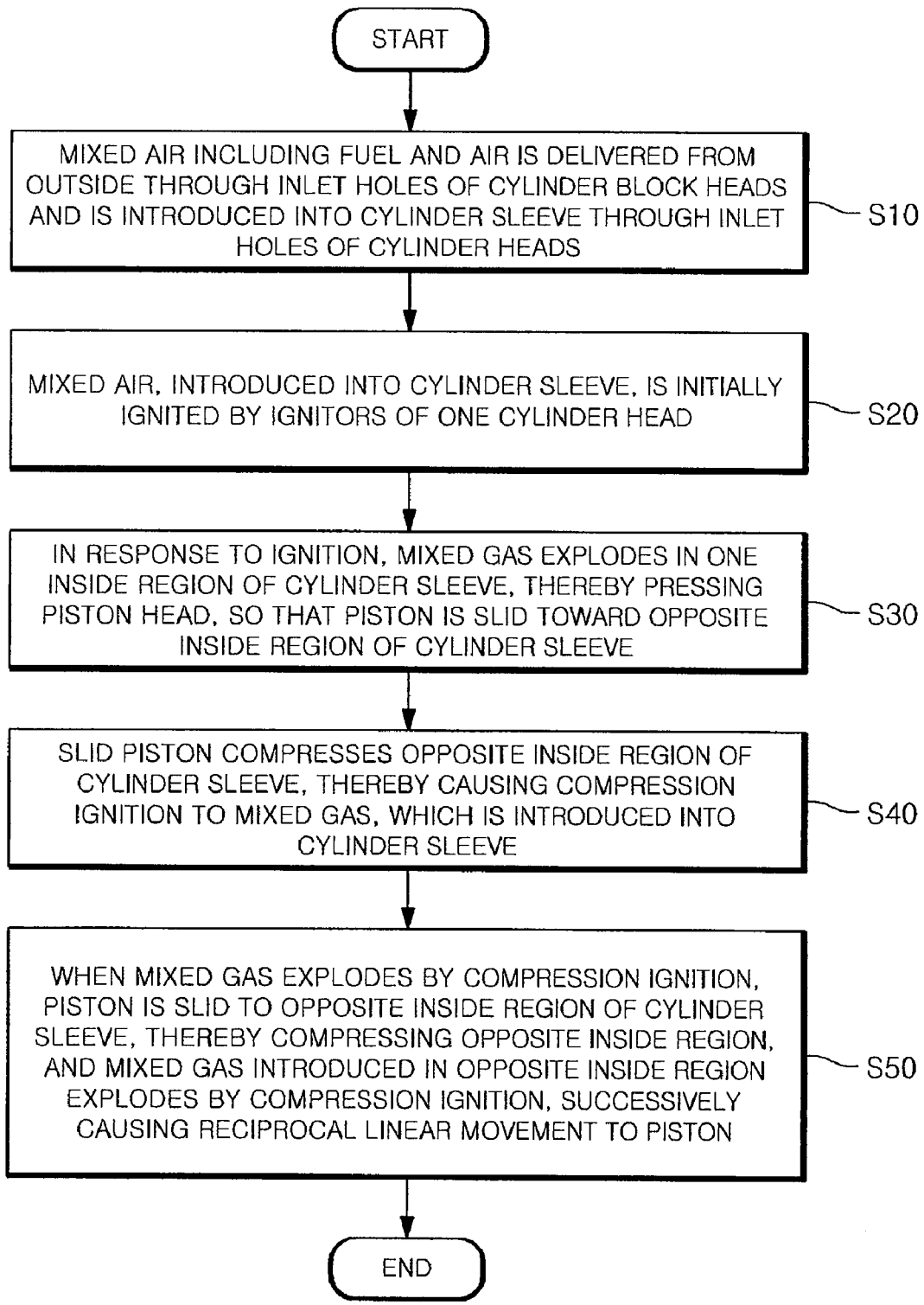
FIG. 27 is a flowchart illustrating a method of operating the third embodiment of the uniflow scavenging micro-engine.

FIG. 27 is a flowchart illustrating a method of operating the third embodiment of the uniflow scavenging micro-engine.

Referring to FIG. 27, according to the method of operating the uniflow scavenging micro-engine 20 of the invention, mixed air including fuel and air is delivered from outside through the inlet holes 211 of the cylinder block heads 210 and is introduced into the cylinder sleeve 250 through the inlet holes 222 of the cylinder heads 220 in S10.

In S20, mixed air, introduced into the cylinder sleeve 250, is initially ignited by the igniters 221 of one of the cylinder heads 220. In the initial ignition, electric current is applied to the igniters 221 through electric lines (not shown) from an outer battery (not shown), so that only the initial ignition of the engine is performed.

In S30, in response to the ignition, mixed gas explodes in one inside region of the cylinder sleeve 250, thereby pressing the piston head 242, so that the piston 240 is slid toward the opposite inside region of the cylinder sleeve 250.

In S40, the slid piston 240 compresses the opposite inside region of the cylinder sleeve 250, thereby causing compression ignition to mixed gas, which is introduced into the cylinder sleeve 250. The protrusion 243 on the piston head 242 is inserted to a position adjacent to the inlet hole 222 of the cylinder head 220, thereby preventing mixed gas from being introduced into the cylinder sleeve 250 in such a direction.

In S50, when mixed gas explodes by compression ignition, the piston 240 is slid to the opposite inside region of the cylinder sleeve 250, thereby compressing the opposite inside region, and mixed gas introduced in the opposite inside region explodes by compression ignition, successively causing reciprocal linear movement to the piston 240. Accordingly, the uniflow scavenging micro-engine 20 is actuated.

In the case of initial ignition by the igniters 221 of the cylinder head 220 or compression ignition by the piston 240, exhaust gas created by explosion is released through the exhaust ports 270 of both the cylinder block 230 and the cylinder sleeve 250, and fresh air is introduced into the cylinder sleeve 250 through the air circulation ports 260.

As set forth above, the compact portable power pack of the present invention includes a fuel/air supply, which is connected to a fuel tank containing dimethyl ether (DME) fuel, and an engine, which performs a series of procedures, such as ignition, explosion, compression and exhaustion to convert mechanical energy into electric energy using the fuel delivered from the fuel/air supply, thereby powering various devices, such as portable electronic devices and autonomous robots. Thus, the compact portable power pack can be easily carried and used without the restriction of spaces and sites, and The fuel/air supply of the present invention can operate a plurality of impellers using the evaporation pressure of fuel and the pressure of exhaust gas in order to mix fuel and air and feed mixed gas into an engine, without additional devices such as a compressor and a pump, thereby reducing material costs, facilitating the manufacturing thereof due to a simple design, and reducing a manufacturing time.

In the uniflow scavenging micro-engine for a portable power pack of the present invention, mixed gas including fuel fed from a fuel tank and air is introduced into a combustion chamber and explodes when ignited by a glow plug, thereby sliding in opposite directions a piston inside the combustion chamber, and exhaust gas generated by the combustion of the mixed gas is released to the outside through an exhaust port of the combustion chamber, so that uniflow scavenging can reduce the loss of mixed gas and thus raise efficiency, and both the initial ignition enabled by the glow plug and the following compression-ignition type combustion cooperate to increase heat efficiency.

In the magnetic suction valve type uniflow scavenging micro-engine of the invention, mixed gas including fuel and air is introduced into a combustion chamber through inlets at the opposite ends of a cylinder head, which the inlets are automatically opened/closed by the motion of a piston, which the mixed gas (fuel and air) introduced into the combustion chamber is initially ignited by igniters at the opposite ends of the cylinder head, which the force of explosion following the initial ignition moves the piston in the opposite direction to compress the opposite space to the combustion chamber, and which the compressed mixed gas in a cylinder sleeve is successively ignited and exploded by compression ignition, so that uniflow scavenging realized by a simple structure can raise the efficiency of the engine, that the simple structure enabled by the simple linear reciprocation can facilitate the manufacture and improve endurance, and that the piston, the cylinder sleeve, and the cylinder head can be manufactured from a ceramic material having excellent heat insulation and low heat expansion, thereby remarkably improving heat efficiency and endurance.

What is claimed is:

1. A portable power pack comprising:
   a fuel/air supply for mixing fuel, which is supplied from outside, with outside air, thereby providing mixed gas;
   a uniflow scavenging micro-engine for receiving mixed gas from the fuel/air supply and igniting mixed gas to explode;
   a control panel for operating and controlling the uniflow scavenging micro-engine;
   a capacitor battery for powering both the control panel and the uniflow scavenging micro-engine, and
   a fuel tank containing dimethyl ether fuel,
   wherein the fuel tank is coupled to a bottom portion of the fuel/air supply and has an outlet in a top portion thereof to feed fuel to the fuel/air supply.

2. A portable power pack comprising:
   a fuel/air supply for mixing fuel, which is supplied from outside, with outside air, thereby providing mixed gas;
   a uniflow scavenging micro-engine for receiving mixed gas from the fuel/air supply and igniting mixed gas to explode;
   a control panel for operating and controlling the uniflow scavenging micro-engine; and
   a capacitor battery for powering both the control panel and the uniflow scavenging micro-engine,
   wherein the fuel/air supply includes:
   a first impeller for drawing in fuel by rotation;

a second impeller for being rotated by pressure of exhaust gas, which is released from the uniflow scavenging micro-engine; and a third impeller for drawing in outside air by rotation.

3. The portable power pack according to claim 2, wherein at least one of the first and third impellers is coupled to the second impeller to rotate integrally with the second impeller.

4. The portable power pack according to claim 2, wherein the first impeller is rotated by evaporation pressure of fuel, which is supplied from outside.

5. The portable power pack according to claim 2, wherein the fuel/air supply includes:

a fuel inlet unit with the first impeller mounted thereon;

an exhaust gas delivery unit with the second impeller mounted thereon;

an air inlet unit with the third impeller mounted thereon;

a fuel/air mixing unit for mixing fuel introduced by the first impeller with fuel introduced by the third impeller to prepare mixed gas; and a cover for supplying mixed gas, prepared in the fuel/air mixing unit, to the uniflow scavenging micro-engine.

6. The portable power pack according to claim 5, wherein the fuel inlet unit, exhaust gas delivery unit, the air inlet unit, the fuel/air mixing unit and the cover are sequentially stacked one on another.

7. A fuel/air supply for mixing fuel from a fuel tank and outside air to feed to a uniflow scavenging micro-engine, comprising:

a first impeller for drawing in fuel by rotation;

a second impeller for being rotated by pressure of exhaust gas, which is released from the uniflow scavenging micro-engine; and a third impeller for drawing in outside air by rotation.

8. The fuel/air supply according to claim 7, wherein at least one of the first and third impellers is coupled to the second impeller to rotate integrally with the second impeller.

9. The fuel/air supply according to claim 7, wherein the first impeller is rotated by evaporation pressure of fuel, which is supplied from outside.

10. The fuel/air supply according to claim 7, further comprising:

a fuel inlet unit with the first impeller mounted thereon;

an exhaust gas delivery unit with the second impeller mounted thereon;

an air inlet unit with the third impeller mounted thereon;

a fuel/air mixing unit for mixing fuel introduced by the first impeller with fuel introduced by the third impeller to prepare mixed gas; and a cover for supplying mixed gas, prepared in the fuel/air mixing unit, to the uniflow scavenging micro-engine.

11. The fuel/air supply according to claim 10, wherein the fuel inlet unit, exhaust gas delivery unit, the air inlet unit, the fuel/air mixing unit and the cover are sequentially stacked one on another.

12. The fuel/air supply according to claim 10, wherein the exhaust gas delivery unit is adapted to draw in exhaust gas from outside in a width direction and release exhaust gas in a longitudinal direction after the second impeller is rotated by exhaust gas.

13. The fuel/air supply according to claim 10, wherein the air inlet unit allows air, which is drawn in by the third impeller, to be fed to the fuel/air mixing unit.

14. A portable power pack comprising:

a fuel/air supply for mixing fuel, which is supplied from outside, with outside air thereby providing mixed gas;

a uniflow scavenging micro-engine for receiving mixed gas from the fuel/air supply and igniting mixed gas to explode;

a control panel for operating and controlling the uniflow scavenging micro-engine;

a capacitor battery for powering both the control panel and the uniflow scavenging micro-engine; and a fuel tank for containing dimethyl ether fuel, wherein the fuel tank is coupled to a bottom portion of the fuel/air supply and has an outlet in a top portion thereof to feed fuel to the fuel/air supply.

\* \* \* \* \*